United States Patent
Ellis et al.

(10) Patent No.: US 9,753,653 B2
(45) Date of Patent: Sep. 5, 2017

(54) HIGH-PRIORITY NAND OPERATIONS MANAGEMENT

(71) Applicant: SanDisk Technologies LLC, Plano, TX (US)

(72) Inventors: Robert W. Ellis, Phoenix, AZ (US); Jack Edward Frayer, Boulder Creek, CA (US); Vidyabhushan Mohan, San Jose, CA (US); Todd Lindberg, Phoenix, AZ (US)

(73) Assignee: SanDisk Technologies LLC, Plano, TX (US)

( * ) Notice: Subject to any disclaimer, the term of this patent is extended or adjusted under 35 U.S.C. 154(b) by 0 days.

(21) Appl. No.: 14/925,941

(22) Filed: Oct. 28, 2015

(65) Prior Publication Data

US 2016/0306553 A1   Oct. 20, 2016

Related U.S. Application Data

(60) Provisional application No. 62/147,544, filed on Apr. 14, 2015.

(51) Int. Cl.
  *G06F 12/00*   (2006.01)
  *G06F 3/06*   (2006.01)
  *G06F 12/02*   (2006.01)

(52) U.S. Cl.
  CPC .......... *G06F 3/0611* (2013.01); *G06F 3/0659* (2013.01); *G06F 3/0679* (2013.01); *G06F 12/02* (2013.01)

(58) Field of Classification Search
  CPC ..... G06F 3/0604; G06F 3/0653; G06F 3/0688
  See application file for complete search history.

(56) References Cited

U.S. PATENT DOCUMENTS

| | | |
|---|---|---|
| 4,586,167 A | 4/1986 | Fujishima et al. |
| 5,559,988 A | 9/1996 | Durante et al. |

(Continued)

FOREIGN PATENT DOCUMENTS

| | | |
|---|---|---|
| EP | 0 376 285 A2 | 7/1990 |
| WO | WO 2012/083308 | 6/2012 |

OTHER PUBLICATIONS

Seagate Technology, "SCSI Commands Reference Manual, Rev. C", Product Manual dated Apr. 2010, pp. 211-214.

(Continued)

*Primary Examiner* — Yong Choe
(74) *Attorney, Agent, or Firm* — Brinks Gilson & Lione

(57) ABSTRACT

Systems, methods, and/or devices are used to manage high-priority NAND operations. In some embodiments, the method includes receiving a first command (e.g., requesting a high-priority memory operation) corresponding to a first location (e.g., having both a first physical address and a first aliased physical address) in a first die of a plurality of physical non-volatile memory die in a storage device. If the first die is performing a blocking low-priority memory operation (e.g., the low-priority operation was sent to the first die using a second physical address), the method includes sending a memory operation command, corresponding to the first memory operation, to the first die using the first aliased physical address. In some embodiments, a predefined die-selection portion of the second physical address matches the predefined die-selection portion of the first physical address and does not match the predefined die-selection portion of the first aliased physical address.

23 Claims, 9 Drawing Sheets

(56) References Cited

U.S. PATENT DOCUMENTS

| | | | |
|---|---|---|---|
| 5,909,559 A | 6/1999 | So | |
| 6,247,136 B1 | 6/2001 | MacWilliams et al. | |
| 6,292,410 B1 | 9/2001 | Yi et al. | |
| 6,401,213 B1 | 6/2002 | Jeddeloh | |
| 6,449,709 B1 | 9/2002 | Gates | |
| 8,122,202 B2 | 2/2012 | Gillingham | |
| 8,825,967 B2 | 9/2014 | Hong Beom | |
| 2003/0115403 A1 | 6/2003 | Bouchard et al. | |
| 2003/0122834 A1 | 7/2003 | Mastronarde et al. | |
| 2004/0117441 A1 | 6/2004 | Liu et al. | |
| 2005/0248992 A1 | 11/2005 | Hwang et al. | |
| 2007/0002629 A1 | 1/2007 | Lee et al. | |
| 2007/0233937 A1 | 10/2007 | Coulson et al. | |
| 2008/0140914 A1 | 6/2008 | Jeon | |
| 2009/0168525 A1 | 7/2009 | Olbrich et al. | |
| 2009/0222627 A1 | 9/2009 | Reid | |
| 2009/0282191 A1 | 11/2009 | Depta | |
| 2010/0005217 A1 | 1/2010 | Jeddeloh | |
| 2010/0014364 A1 | 1/2010 | Laberge et al. | |
| 2010/0174853 A1 | 7/2010 | Lee et al. | |
| 2010/0220509 A1 | 9/2010 | Sokolov et al. | |
| 2010/0250874 A1 | 9/2010 | Farrell et al. | |
| 2011/0113204 A1* | 5/2011 | Henriksson | G06F 13/1668 711/154 |
| 2011/0264851 A1 | 10/2011 | Jeon et al. | |
| 2011/0302474 A1 | 12/2011 | Goss et al. | |
| 2012/0030408 A1 | 2/2012 | Flynn et al. | |
| 2012/0047317 A1 | 2/2012 | Yoon et al. | |
| 2012/0159070 A1 | 6/2012 | Baderdinni et al. | |
| 2013/0007380 A1 | 1/2013 | Seekins et al. | |
| 2013/0070507 A1 | 3/2013 | Yoon | |
| 2013/0132650 A1 | 5/2013 | Choi et al. | |
| 2013/0182506 A1 | 7/2013 | Melik-Martirosian | |
| 2013/0219106 A1 | 8/2013 | Vogan et al. | |
| 2013/0254498 A1 | 9/2013 | Adachi et al. | |
| 2013/0297894 A1 | 11/2013 | Cohen et al. | |
| 2014/0047170 A1 | 2/2014 | Cohen et al. | |
| 2014/0229655 A1 | 8/2014 | Goss et al. | |
| 2014/0229656 A1 | 8/2014 | Goss et al. | |
| 2014/0241071 A1 | 8/2014 | Goss et al. | |
| 2014/0244897 A1 | 8/2014 | Goss et al. | |
| 2014/0258598 A1 | 9/2014 | Canepa et al. | |
| 2014/0310241 A1 | 10/2014 | Goyen | |
| 2015/0095558 A1 | 4/2015 | Kim et al. | |
| 2015/0186278 A1 | 7/2015 | Jayakumar et al. | |
| 2015/0301749 A1 | 10/2015 | Seo et al. | |
| 2015/0331627 A1 | 11/2015 | Kwak | |
| 2016/0070493 A1 | 3/2016 | Oh et al. | |
| 2016/0170671 A1 | 6/2016 | Huang | |
| 2016/0170831 A1 | 6/2016 | Lesartre et al. | |
| 2016/0179403 A1 | 6/2016 | Kurotsuchi et al. | |

OTHER PUBLICATIONS

International Search Report and Written Opinion dated Nov. 18, 2015, received in International Patent Application No. PCT/US2015/039552 which corresponds to U.S. Appl. No. 14/559,183, 11 pages (Ellis).

International Search Report and Written Opinion dated Jul. 4, 2016, received in International Patent Application No. PCT/US2016/028477, which corresponds to U.S. Appl. No. 14/883,540, 11 pages (Hodgdon).

International Search Report and Written Opinion dated Nov. 9, 2015, received in International Patent Application No. PCT/US2015/053551, which corresponds to U.S. Appl. No. 14/668,690, 12 pages (Thangaraj).

International Search Report and Written Opinion dated Nov. 11, 2015, received in International Patent Application No. PCT/US2015/053582, which corresponds to U.S. Appl. No. 14/659,493, 12 pages (Prins).

International Search Report and Written Opinion dated Sep. 8, 2016, received in International Patent Application No. PCT/US2016/036716, which corresponds to U.S. Appl. No. 14/925,945, 13 pages (Ellis).

* cited by examiner

Status Monitoring Data
Structure 232, 260

| | Command Type | High-priority? | NVM Die | Plane | Status |
|---|---|---|---|---|---|
| Header 304-0 | | | | | |
| Record 304-1 | Read | No | 3 | 0 | Complete |
| Record 304-2 | Read | No | 3 | 0 | Suspended |
| Record 304-3 | Read | Yes | 3 | 1 | Processing |
| Record 304-z | ⋮ | ⋮ | ⋮ | ⋮ | ⋮ |

Figure 3A

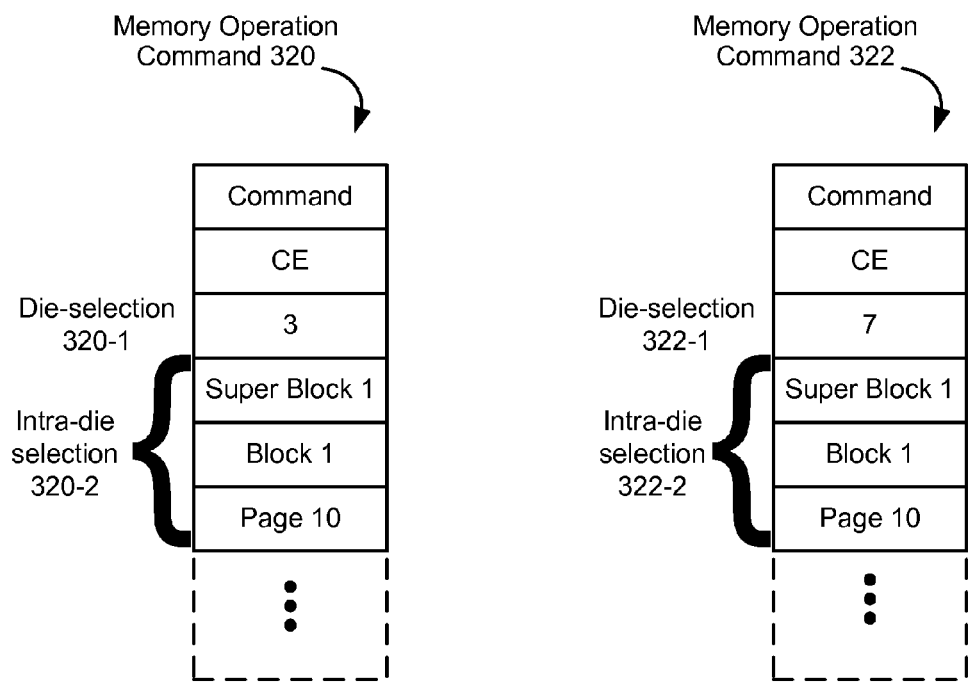

Memory Operation Command 320

| Command |
| CE |
| 3 |
| Super Block 1 |
| Block 1 |
| Page 10 |

Die-selection 320-1
Intra-die selection 320-2

Memory Operation Command 322

| Command |
| CE |
| 7 |
| Super Block 1 |
| Block 1 |
| Page 10 |

Die-selection 322-1
Intra-die selection 322-2

Figure 3B

HIGH-PRIORITY NAND OPERATIONS MANAGEMENT

RELATED APPLICATIONS

This application claims priority to U.S. Provisional Patent Application No. 62/147,544, filed Apr. 14, 2015, which is incorporated by reference in its entirety.

TECHNICAL FIELD

The disclosed embodiments relate generally to command processing in a storage device (e.g., a device including one or more flash memory devices), and in particular, to managing high-priority NAND operations in storage devices.

BACKGROUND

Semiconductor memory devices, including flash memory, typically utilize memory cells to store data as an electrical value, such as an electrical charge or voltage. A flash memory cell, for example, includes a single transistor with a floating gate that is used to store a charge representative of a data value. Flash memory is a non-volatile data storage device that can be electrically erased and reprogrammed. More generally, non-volatile memory (e.g., flash memory, as well as other types of non-volatile memory implemented using any of a variety of technologies) retains stored information even without power, as opposed to volatile memory, which requires power to maintain the stored information.

State machines are, in some embodiments, used in a storage controller of a non-volatile memory device (e.g., comprising a plurality of physical non-volatile memory die) to help manage command processing. After receiving a command, the state machine determines whether a location on a non-volatile memory die corresponding to the received command is busy (e.g., currently executing a memory operation). If the location is busy, then the non-volatile memory device waits and sends the command (or a memory operation corresponding to the command) when the location is no longer busy. Therefore, in such embodiments, a non-volatile memory device may permit a slow low-priority operation (e.g., a write operation) to complete execution before beginning execution of a higher-priority fast operation (e.g., a read operation requested by a host device), resulting in a waste of computing resources and causing non-volatile memory devices to violate quality of service metrics (i.e., performance-based warranties) associated with a maximum latency for commands sent by a host system.

SUMMARY

Without limiting the scope of the appended claims, after considering this disclosure, and particularly after considering the section entitled "Detailed Description" one will understand how the aspects of various embodiments are implemented and used to improve command executions times by intelligently managing high-priority NAND operations. In some embodiments, a storage device that includes a plurality of physical non-volatile memory die receives a request to perform a high-priority memory operation at a first location in a first die of the plurality of physical non-volatile memory die. The first location, in some embodiments, has both a first physical address and a first aliased physical address distinct from the first physical address. In accordance with a determination that the first die is performing a blocking low-priority memory operation (e.g., the low-priority memory operation was sent to the first die using a second physical address), the storage device sends the high-priority memory operation to the first die using the first aliased physical address. In some embodiments, a predefined die-selection portion of the second physical address matches the predefined die-selection portion of the first physical address and does not match the predefined die-selection portion of the first aliased physical address.

BRIEF DESCRIPTION OF THE DRAWINGS

So that the present disclosure can be understood in greater detail, a more particular description may be had by reference to the features of various embodiments, some of which are illustrated in the appended drawings. The appended drawings, however, merely illustrate pertinent features of the present disclosure and are therefore not to be considered limiting, for the description may admit to other effective features.

FIG. 3A is a block diagram illustrating status monitoring data structures and, more specifically, a status table for managing high-priority operations, in accordance with some embodiments.

FIG. 3B is a block diagram illustrating memory operation commands.

Figure 1A:
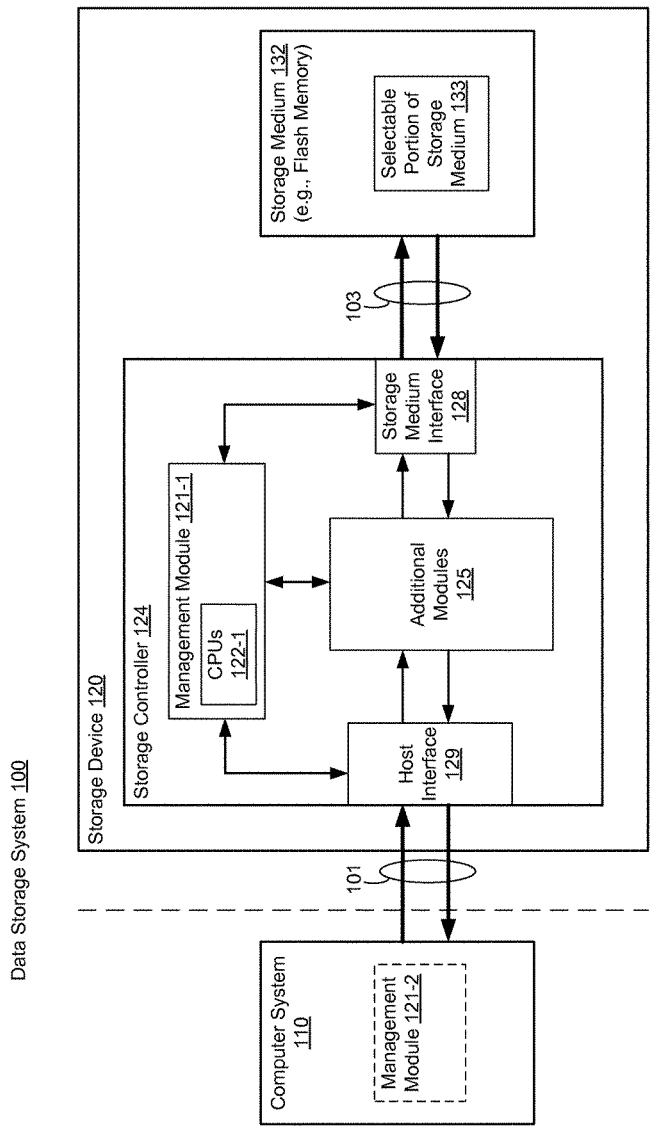
FIGS. 1A and 1B are block diagrams illustrating implementations of a data storage system in accordance with some embodiments.

In accordance with common practice, the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

When a storage device (e.g., a non-volatile memory device having a plurality of physical non-volatile memory die) is unable to send a command to a non-volatile memory die that is currently executing a blocking low-priority operation (e.g., because a state machine of a storage controller of the storage device indicates that the die, or a required portion of the die, is busy), violations of quality of service metrics can occur (e.g., because commands with quality of service metrics requiring fast execution times have to wait on slow commands, thereby making it difficult to meet the quality of service metric). Consequently, what is desired are mechanisms for managing high-priority NAND operations, in order to ensure that high-priority commands are executed quickly and do not need to wait for completed execution of low-priority commands.

The various embodiments described herein include systems, methods, and/or devices used to manage high-priority operations in a storage device. Some embodiments include systems, methods and/or devices to send high-priority memory operations to a non-volatile memory die using an aliased address for the non-volatile memory die, while the non-volatile memory die is executing a low-priority operation.

(A1) More specifically, some embodiments include a method of managing a storage device that includes a plurality of physical non-volatile memory die. In some embodiments, the method includes receiving at the storage device a first command corresponding to a first location in a first die of the plurality of physical non-volatile memory die in the storage device. The first command, in some embodiments or circumstances, requests a first memory operation including a high-priority operation and the first location has both a first physical address and a first aliased physical address distinct from the first physical address. In accordance with a determination that the first die is performing a blocking low-priority memory operation, the method further includes: sending a memory operation command, corresponding to the first memory operation, to the first die using the first aliased physical address. In some embodiments or circumstances, the blocking low-priority operation was sent to the first die using a second physical address. A predefined die-selection portion of the second physical address, in some embodiments, matches the predefined die-selection portion of the first physical address and does not match the predefined die-selection portion of the first aliased physical address.

(A2) In some embodiments of the method of A1, the method further includes: in response to receiving the first command, determining whether the first die is performing a blocking low-priority memory operation.

(A3) In some embodiments of the method of any one of A1 to A2, a predefined intra-die portion of the first physical address matches the predefined intra-die portion of the first aliased physical address, and the predefined die-selection portion of the first physical address does not match the predefined die-selection portion of the first aliased physical address.

(A4) In some embodiments of the method of any one of A1 to A3, the method further includes: at the first die, in response to receiving the memory operation command corresponding to the first memory operation, suspending performance of the blocking low-priority memory operation. After the suspending, the method further includes performing the first memory operation. After performing the first memory operation, the method further includes resuming performance of the blocking low-priority memory operation.

(A5) In some embodiments of the method of any one of A1 to A3, the method further includes, at the first die, in response to receiving the memory operation command corresponding to the first memory operation, suspending performance of the blocking low-priority memory operation. After the suspending, the method further includes performing the first memory operation. After performing the first memory operation and in accordance with a determination that the suspended blocking low-priority memory operation is not yet complete, the method further includes resuming performance of the blocking low-priority memory operation.

(A6) In some embodiments of the method of any of any one of A4 or A5, suspending performance of the blocking low-priority memory operation includes the first die automatically suspending performance of the blocking low-priority memory operation after receiving the memory operation command corresponding to the first memory operation.

(A7) In some embodiments of the method of any one of A4 to A6, the method further includes: after the suspending and prior to the resuming, performing the first memory operation and another memory operation including a second high-priority memory operation.

(A8) In some embodiments of the method of any one of A1 to A3, performance of the blocking low-priority memory operation includes execution of a sequence of segmented memory operations. In some embodiments, the method further includes: in response to receiving the memory operation command corresponding to the first memory operation, suspending performance of the blocking low-priority memory operation upon completion of a respective segment of the sequence of segmented memory operations. After the suspending, the method further includes performing the first memory operation. After performing the first memory operation, the method further includes resuming performance of the blocking low-priority memory operation by performing a next segment of the sequence of segmented memory operations.

(A9) In some embodiments of the method of A8, the first command is received at a storage controller of the storage device, the suspending and resuming performance of the blocking low-priority memory operation is performed by a local controller in a module having two or more die of the plurality of physical die, and the local controller is distinct from the storage controller of the storage device.

(A10) In some embodiments of the method of any one of A1 to A9, the first command requests a read operation.

(A11) In some embodiments of the method of A10, the method further includes: sending a second memory operation command, corresponding to a low-priority read operation, to the first die using a physical address having a predefined die-selection portion that matches the predefined die-selection portion of the second physical address.

(A12) In some embodiments of the method of any one of A1 to A11, the blocking low-priority memory operation is an erase operation or a write operation.

(A13) In another aspect, a storage device includes non-volatile memory (e.g., one or more non-volatile storage devices, such as flash memory devices), one or more processors, and a storage controller having one or more controller modules configured to receive at the storage device a first command corresponding to a first location in a first die of the plurality of physical non-volatile memory die in the storage device. The first command, in some embodiments or circumstances, requests a first memory operation including a high-priority operation and the first location has both a first physical address and a first aliased physical address distinct from the first physical address. The one or more controller modules are further configured to send, in accordance with a determination that the first die is performing a blocking low-priority memory operation, a memory operation command, corresponding to the first memory operation, to the first die using the first aliased physical address. The blocking low-priority operation, in some embodiments, was sent to the first die using a second physical address, a predefined die-selection portion of which matches the predefined die-selection portion of the first physical address and does not match the predefined die-selection portion of the first aliased physical address.

(A14) In some embodiments of the storage device of A13, the one or more controller modules include: 1) a status monitoring module to determine whether the first die is performing a blocking low-priority memory operation; and 2) a command processing module to receive at the storage device the first command and to send, in accordance with the determination that the first die is performing a blocking low-priority memory operation, the memory operation command corresponding to the first memory operation to the first die using the first aliased physical address.

(A15) In some embodiments of the storage device of A14, the storage device further includes a plurality of storage modules, each storage module including: 1) a local controller including an instance of the command processing module and an instance of the status monitoring module; and 2) a plurality of non-volatile memory devices. In some embodiments or circumstances, the first command is for reading data from a first storage module of the plurality of storage modules, and the first storage module includes the first die. The instance of the status monitoring module in the first storage module is configured, in some embodiments, to determine whether the first die is performing a blocking low-priority memory operation.

(A16) In some embodiments of the storage device of any one of A13 to A14, the storage device further includes a plurality of storage modules, each storage module having a local controller and a plurality of non-volatile memory devices.

(A17) In some embodiments of the storage device of any one of A13 to A16, the one or more controller modules are further configured to perform the method of any one of A2 to A12 described above.

(A18) In yet another aspect, a storage device includes non-volatile memory, one or more processors, and means for performing of the method of any one of A1 to A12 described above.

(A19) In yet another aspect, a non-transitory computer-readable storage medium stores one or more programs configured for execution by one or more processors of a storage device, the one or more programs including instructions for causing the storage device to perform the method of any one of A1 to A12 described above.

Numerous details are described herein in order to provide a thorough understanding of the example embodiments illustrated in the accompanying drawings. However, some embodiments may be practiced without many of the specific details, and the scope of the claims is only limited by those features and aspects specifically recited in the claims. Furthermore, well-known methods, components, and circuits have not been described in exhaustive detail so as not to unnecessarily obscure pertinent aspects of the embodiments described herein.

FIG. 1A is a block diagram illustrating an implementation of a data storage system 100, in accordance with some embodiments. While some example features are illustrated, various other features have not been illustrated for the sake of brevity and so as not to obscure pertinent aspects of the example embodiments disclosed herein. To that end, as a non-limiting example, data storage system 100 includes a storage device 120 (also sometimes called an information storage device, or a data storage device, or a memory device), which includes a storage controller 124 and a storage medium 132, and is used in conjunction with or includes a computer system 110 (e.g., a host system or a host computer). In some embodiments, storage medium 132 is a single flash memory device while in other embodiments storage medium 132 includes a plurality of flash memory devices. In some embodiments, storage medium 132 is NAND-type flash memory or NOR-type flash memory. In some embodiments, storage medium 132 includes one or more three-dimensional (3D) memory devices. Further, in some embodiments, storage controller 124 is a solid-state drive (SSD) controller. However, other types of storage media may be included in accordance with aspects of a wide variety of embodiments (e.g., PCRAM, ReRAM, STT-RAM, etc.). In some embodiments, a flash memory device includes one or more flash memory die, one or more flash memory packages, one or more flash memory channels or the like. In some embodiments, data storage system 100 can contain one or more storage devices 120.

Computer system 110 is coupled to storage controller 124 through data connections 101. However, in some embodiments computer system 110 includes storage controller 124, or a portion of storage controller 124, as a component and/or as a subsystem. For example, in some embodiments, some or all of the functionality of storage controller 124 is implemented by software executed on computer system 110. Computer system 110 may be any suitable computer device, such as a computer, a laptop computer, a tablet device, a netbook, an internet kiosk, a personal digital assistant, a mobile phone, a smart phone, a gaming device, a computer server, or any other computing device. Computer system 110 is sometimes called a host, host system, client, or client system. In some embodiments, computer system 110 is a server system, such as a server system in a data center. In some embodiments, computer system 110 includes one or more processors, one or more types of memory, a display and/or other user interface components such as a keyboard, a touch-screen display, a mouse, a track-pad, a digital camera, and/or any number of supplemental I/O devices to add functionality to computer system 110. In some embodiments, computer system 110 does not have a display and other user interface components.

Storage medium 132 is coupled to storage controller 124 through connections 103. Connections 103 are sometimes called data connections, but typically convey commands in addition to data, and optionally convey metadata, error correction information and/or other information in addition to data values to be stored in storage medium 132 and data values read from storage medium 132. In some embodiments, however, storage controller 124 and storage medium 132 are included in the same device (i.e., an integrated device) as components thereof. Furthermore, in some embodiments, storage controller 124 and storage medium 132 are embedded in a host device (e.g., computer system 110), such as a mobile device, tablet, other computer or computer controlled device, and the methods described herein are performed, at least in part, by the embedded storage controller. Storage medium 132 may include any number (i.e., one or more) of memory devices including, without limitation, non-volatile semiconductor memory devices, such as flash memory device(s). For example, flash memory device(s) can be configured for enterprise storage suitable for applications such as cloud computing, for database applications, primary and/or secondary storage, or for caching data stored (or to be stored) in secondary storage, such as hard disk drives. Additionally and/or alternatively, flash memory device(s) can also be configured for relatively smaller-scale applications such as personal flash drives or hard-disk replacements for personal, laptop, and tablet computers.

Storage medium 132 is divided into a number of addressable and individually selectable blocks, such as selectable portion 133. In some embodiments, the individually selectable blocks are the minimum size erasable units in a flash memory device. In other words, each block contains the minimum number of memory cells that can be erased without erasing any other memory cells in the same flash memory device. Typically, when a flash memory block is erased, all memory cells in the block are erased simultaneously. Each block is usually further divided into a plurality of pages and/or word lines, where each page or word line is typically an instance of the smallest individually accessible (readable) portion in a block. In some embodiments (e.g., using some types of flash memory), the smallest individually accessible unit of a data set, however, is a sector, which is a subunit of a page. That is, a block includes a plurality of pages, each page contains a plurality of sectors, and each sector is the minimum unit of data for reading data from the flash memory device. For example, in some implementations, each block includes a number of pages, such as 64 pages, 128 pages, 256 pages or another suitable number of pages. Blocks are typically grouped into a plurality of zones. Each block zone can be independently managed to some extent, which increases the degree of parallelism for parallel operations and simplifies management of storage medium 132.

Additionally, if data is written to a storage medium in pages, but the storage medium is erased in blocks, pages in the storage medium may contain invalid (e.g., stale) data, but those pages cannot be overwritten until the whole block containing those pages is erased. In order to write to the pages with invalid data, the pages (if any) with valid data in that block are read and re-written to a new block and the old block is erased (or put on a queue for erasing). This process is called garbage collection. After garbage collection, the new block contains the pages with valid data and may have free pages that are available for new data to be written, and the old block can be erased so as to be available for new data to be written. Since flash memory can only be programmed and erased a limited number of times, the efficiency of the algorithm used to pick the next block(s) to re-write and erase has a significant impact on the lifetime and reliability of flash-based storage systems.

Another phenomenon that impacts the lifetime and reliability of flash-based storage systems (in some embodiments, storage medium 132) is write amplification. Write amplification is a phenomenon where the actual amount of physical data written to a storage medium (e.g., NVM devices 140, 142 in storage device 120) is a multiple of the logical amount of data written by a host (e.g., computer system 110, sometimes called a host) to the storage medium. As discussed above, when a block of storage medium must be erased before it can be re-written, the garbage collection process to perform these operations results in re-writing data one or more times. This multiplying effect increases the number of writes required over the life of a storage medium, which shortens the time it can reliably operate. The formula to calculate the write amplification of a storage system is given by equation:

$$\frac{\text{amount of data written to a storage medium}}{\text{amount of data written by a host}}$$

One of the goals of any flash memory based data storage system architecture is to reduce write amplification as much as possible so that available endurance is used to meet storage medium reliability and warranty specifications. Higher system endurance also results in lower cost as the storage system may need less over-provisioning, where over-provisioning is storage capacity in a storage device or system that is in excess of the declared capacity of the storage device or system. By reducing write amplification, the endurance of the storage medium is increased and the overall cost of the storage system is decreased. Generally, garbage collection is performed on erase blocks with the fewest number of valid pages for best performance and best write amplification.

Continuing with the description of FIG. 1A, in some embodiments, storage controller 124 includes a management module 121-1, a host interface 129, a storage medium (I/O) interface 128, and additional module(s) 125. Storage controller 124 may include various additional features that have not been illustrated for the sake of brevity and so as not to obscure pertinent features of the example embodiments disclosed herein, and a different arrangement of features may be possible.

Host interface 129 provides an interface to computer system 110 through data connections 101. Similarly, storage medium interface 128 provides an interface to storage medium 132 though connections 103. In some embodiments, storage medium interface 128 includes read and write circuitry, including circuitry capable of providing reading signals to storage medium 132 (e.g., reading threshold voltages for NAND-type flash memory, as discussed below). In some embodiments, connections 101 and connections 103 are implemented as a communication media over which commands and data are communicated, using a protocol such as DDR3, SCSI, SATA, SAS, or the like. In some embodiments, storage controller 124 includes one or more processing units (also sometimes called CPUs, processors, microprocessors, or microcontrollers) configured to execute instructions in one or more programs (e.g., in storage controller 124). In some embodiments, the one or more processors are shared by one or more components within, and in some cases, beyond the function of storage controller 124.

In some embodiments, management module 121-1 includes one or more central processing units (CPUs, also sometimes called processors, microprocessors or microcontrollers) 122 configured to execute instructions in one or more programs (e.g., in management module 121-1). In some embodiments, the one or more CPUs 122 are shared by one or more components within, and in some cases, beyond the function of storage controller 124. Management module 121-1 is coupled to host interface 129, additional module(s) 125 and storage medium interface 128 in order to coordinate the operation of these components. In some embodiments, one or more modules of management module 121-1 are implemented in management module 121-2 of computer system 110. In some embodiments, one or more processors of computer system 110 (not shown) are configured to execute instructions in one or more programs (e.g., in management module 121-2). Management module 121-2 is coupled to storage device 120 in order to manage the operation of storage device 120.

Additional module(s) 125 are coupled to storage medium interface 128, host interface 129, and management module 121-1. As an example, additional module(s) 125 may include an error control module to limit the number of uncorrectable errors inadvertently introduced into data during writes to memory and/or reads from memory. In some embodiments, additional module(s) 125 are executed in software by the one or more CPUs 122 of management module 121-1, and, in other embodiments, additional module(s) 125 are implemented in whole or in part using special purpose circuitry (e.g., to perform encoding and decoding functions). In some embodiments, additional module(s) 125 are implemented in whole or in part by software executed on computer system 110.

As data storage densities of non-volatile semiconductor memory devices continue to increase, stored data is more prone to being stored and/or read erroneously. In some embodiments, error control coding can be utilized to limit the number of uncorrectable errors that are introduced by electrical fluctuations, defects in the storage medium, operating conditions, device history, write-read circuitry, etc., or a combination of these and various other factors.

In some embodiments, an error control module, included in additional module(s) 125, includes an encoder and a decoder. In some embodiments, the encoder encodes data by applying an error control code (ECC) to produce a codeword, which is subsequently stored in storage medium 132. When encoded data (e.g., one or more codewords) is read from storage medium 132, the decoder applies a decoding process to the encoded data to recover the data, and to correct errors in the recovered data within the error correcting capability of the error control code. Those skilled in the art will appreciate that various error control codes have different error detection and correction capacities, and that particular codes are selected for various applications for reasons beyond the scope of this disclosure. As such, an exhaustive review of the various types of error control codes is not provided herein. Moreover, those skilled in the art will appreciate that each type or family of error control codes may have encoding and decoding algorithms that are particular to the type or family of error control codes. On the other hand, some algorithms may be utilized at least to some extent in the decoding of a number of different types or families of error control codes. As such, for the sake of brevity, an exhaustive description of the various types of encoding and decoding algorithms generally available and known to those skilled in the art is not provided herein.

In some embodiments, during a write operation, host interface 129 receives data to be stored in storage medium 132 from computer system 110. The data received by host interface 129 is made available to an encoder (e.g., in additional module(s) 125), which encodes the data to produce one or more codewords. The one or more codewords are made available to storage medium interface 128, which transfers the one or more codewords to storage medium 132 in a manner dependent on the type of storage medium being utilized.

In some embodiments, a read operation is initiated when computer system (host) 110 sends one or more host read commands (e.g., via data connections 101, or alternatively a separate control line or bus) to storage controller 124 requesting data from storage medium 132. Storage controller 124 sends one or more read access commands to storage medium 132, via storage medium interface 128, to obtain raw read data in accordance with memory locations (or logical addresses, object identifiers, or the like) specified by the one or more host read commands. Storage medium interface 128 provides the raw read data (e.g., comprising one or more codewords) to a decoder (e.g., in additional module(s) 125). If the decoding is successful, the decoded data is provided to host interface 129, where the decoded data is made available to computer system 110. In some embodiments, if the decoding is not successful, storage controller 124 may resort to a number of remedial actions or provide an indication of an irresolvable error condition.

As explained above, a storage medium (e.g., NVM devices 140, 142) is divided into a number of addressable and individually selectable blocks and each block is optionally (but typically) further divided into a plurality of pages and/or word lines and/or sectors. While erasure of a storage medium is performed on a block basis, in many embodiments, reading and programming of the storage medium is performed on a smaller subunit of a block (e.g., on a page basis, word line basis, or sector basis). In some embodiments, the smaller subunit of a block consists of multiple memory cells (e.g., single-level cells or multi-level cells). In some embodiments, programming is performed on an entire page. In some embodiments, a multi-level cell (MLC) NAND flash typically has four possible states per cell, yielding two bits of information per cell. Further, in some embodiments, a MLC NAND has two page types: (1) a lower page (sometimes called fast page), and (2) an upper page (sometimes called slow page). In some embodiments, a triple-level cell (TLC) NAND flash has eight possible states per cell, yielding three bits of information per cell. Although the description herein uses TLC, MLC, and SLC as examples, those skilled in the art will appreciate that the embodiments described herein may be extended to memory cells that have more than eight possible states per cell, yielding more than three bits of information per cell. In some embodiments, the encoding format of the storage media (i.e., TLC, MLC, or SLC and/or a chosen data redundancy mechanism) is a choice made (or implemented) when data is actually written to the storage media.

In some embodiments, the memory die (e.g., NVM devices 140, 142) can handle only one memory operation (e.g., read, write or erase) at a time, but in other embodiments, the memory die are so-called multi-plane devices that can execute, in parallel, one command per plane. Typically, such memory die have two planes, and can execute two commands in parallel. But in other embodiments, such memory die may have N planes, where N is greater than 2, and can execute N memory commands in parallel. When a currently executing memory command and/or a previously enqueued memory command awaiting execution is directed to the same die and plane as a newly received memory command, sending the newly received memory command to the memory die must be delayed, absent some form of intervention, until the currently executing memory command and/or any previously enqueued memory command awaiting execution by the same memory die and plane have completed execution.

A "blocking low-priority memory operation" is thus a previously received memory operation (A) that requires the same resources (e.g., the same memory die, in the case of a single-plane memory die, or the same memory die and plane in the case of a multi-plan memory die) as a currently received or newly received memory operation command, and (B) that has not yet completed execution.

Flash memory devices (in some embodiments, storage medium 132) utilize memory cells (e.g., SLC, MLC, and/or TLC) to store data as electrical values, such as electrical charges or voltages. Each flash memory cell typically includes a single transistor with a floating gate that is used to store a charge, which modifies the threshold voltage of the transistor (i.e., the voltage needed to turn the transistor on). The magnitude of the charge, and the corresponding threshold voltage the charge creates, is used to represent one or more data values. In some embodiments, during a read operation, a reading threshold voltage is applied to the control gate of the transistor and the resulting sensed current or voltage is mapped to a data value.

The terms "cell voltage" and "memory cell voltage," in the context of flash memory cells, mean the threshold voltage of the memory cell, which is the minimum voltage that needs to be applied to the gate of the memory cell's transistor in order for the transistor to conduct current. Similarly, reading threshold voltages (sometimes also called reading signals and reading voltages) applied to flash memory cells are gate voltages applied to the gates of the flash memory cells to determine whether the memory cells conduct current at that gate voltage. In some embodiments, when a flash memory cell's transistor conducts current at a given reading threshold voltage, indicating that the cell voltage is less than the reading threshold voltage, the raw data value for that read operation is a "1" and otherwise the raw data value is a "0."

Figure 1B:
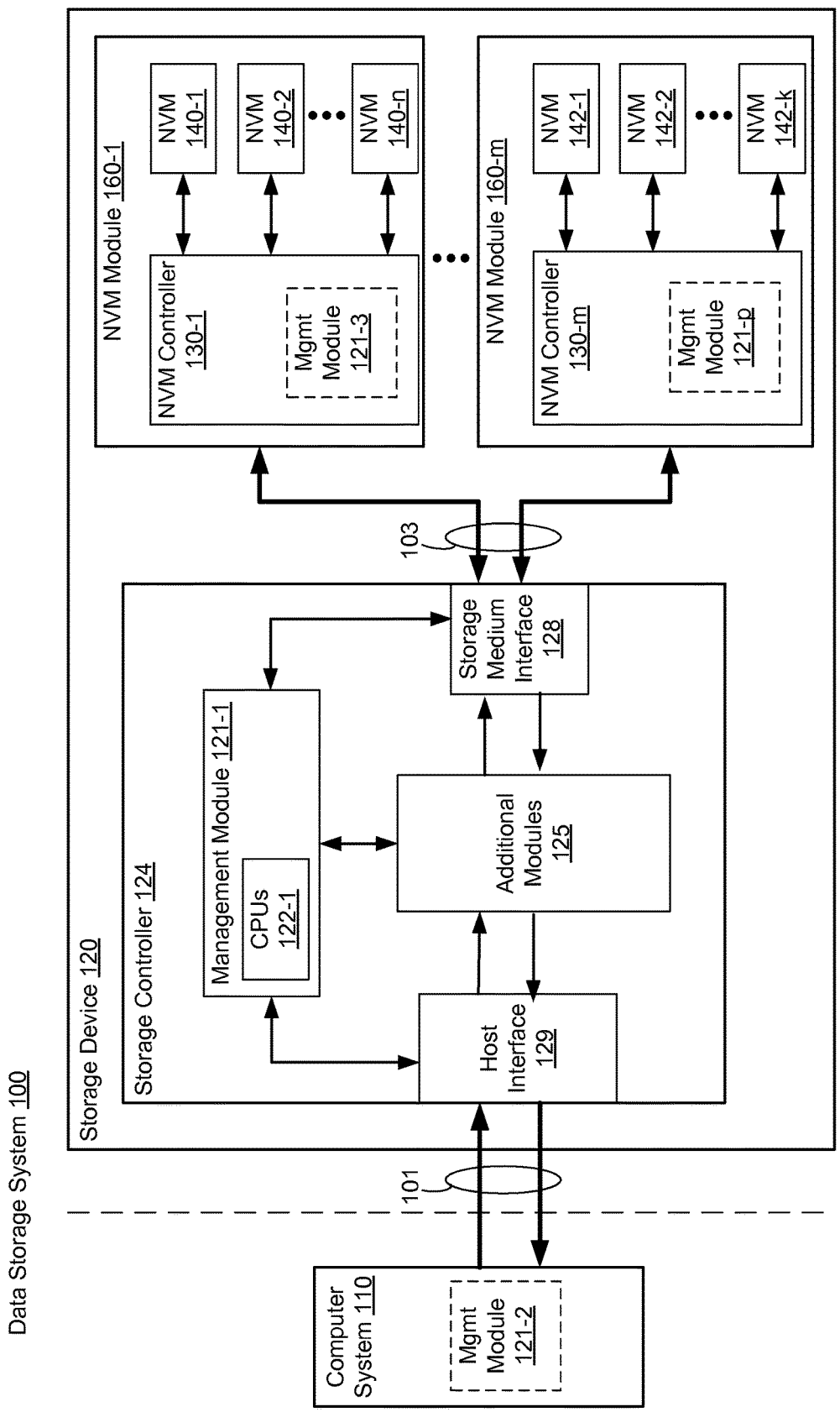

Attention is now directed to FIG. 1B, illustrating a block diagram of an implementation of a data storage system 100, in accordance with some embodiments. To avoid needless repetition of explanations already provided above, features and components of data storage system 100 already shown in FIG. 1A and described above, and shown again in FIG. 1B, are not described again here, and instead only additional features and components are described with respect to FIG. 1B. Additionally, some components illustrated in FIG. 1A are, in some embodiments, still a part of the implementation illustrated in FIG. 1B, although not explicitly illustrated. For example, NVM Modules 160, in some embodiments are included as components of storage medium 132 (FIG. 1A). As such, the features and components of storage medium 132, described above with respect to in FIG. 1A, are in some embodiments also applicable to NVM devices 140, 142 contained within NVM Modules 160. In some embodiments in which data storage system 100 includes a plurality of storage devices 120, one or more of the storage devices are configured as illustrated in FIG. 1B, while other storage devices are configured as illustrated in FIG. 1A.

As a non-limiting example, data storage system 100 includes storage device 120, which includes one or more NVM modules (e.g., NVM modules(s) 160). Each NVM module 160 includes one or more NVM module controllers (e.g., NVM module controllers 130-1 through 130-m), and one or more NVM devices (e.g., one or more NVM device(s) 140, 142).

In this non-limiting example, data storage system 100 is used in conjunction with computer system 110. In some implementations, storage device 120 includes a single NVM device while in other implementations storage device 120 includes a plurality of NVM devices. In some implementations, NVM devices 140, 142 include NAND-type flash memory or NOR-type flash memory. Further, in some implementations, each NVM module controller 130 is or includes a solid-state drive (SSD) controller. However, one or more other types of storage media may be included in accordance with aspects of a wide variety of implementations.

In some embodiments, the one or more NVM controllers 130 are coupled with storage controller 124 through connections 103. Connections 103 are sometimes called data connections, but typically convey commands in addition to data, and optionally convey metadata, error correction information, and/or other information in addition to data values to be stored in NVM devices 140, 142 and data values read from NVM devices 140, 142. In some embodiments, however, storage controller 124, the one or more NVM controllers 130, and NVM devices 140, 142 are included in the same device (i.e., an integrated device such as storage medium 132 of FIG. 1A) as components thereof. Furthermore, in some embodiments, storage controller 124, is embedded in a host device (e.g., computer system 110), such as a mobile device, tablet, other computer or computer controlled device, and the methods described herein are performed, at least in part, by the embedded storage controller.

In some embodiments, one or more NVM modules 160 include NVM devices 140, 142 such as flash memory devices (e.g., NVM devices 140-1 through 140-n, and NVM devices 142-1 through 142-k) and NVM controllers 130 (e.g., NVM controllers 130-1 through 130-m). Viewed another way, storage device 120 includes m memory channels, each of which has an NVM controller 130 and a set of NVM devices 140 or 142 coupled to the NVM controller 130, where m is an integer greater than one. However, in some embodiments, two or more memory channels share an NVM controller 130. In either example, each memory channel has its own distinct set of NVM devices 140 or 142. In a non-limiting example, the number of memory channels in a typical NVM module is 8, 16 or 32. In another non-limiting example, the number of NVM devices 140 or 142 per memory channel is typically 8, 16, 32 or 64. Furthermore, in some embodiments, the number of NVM devices 140/142 is different in different memory channels.

In some embodiments, the NVM modules 160 each include a portion of cache memory, for example implementing a write cache, while in other embodiments, only storage controller 124 implements a write cache. In some embodiments, each NVM module controller 130 optionally includes a management module 121 (e.g., management module 121-3 of NVM controller 130-1). The management modules 121 of the NVM modules 160 also, in some embodiments, include one or more CPUs 234 (FIG. 2B).

In some embodiments, management module 121-3 of NVM controller 130-1 of NVM module 160-1 performs or shares some of the tasks typically performed by management module 121-1 of storage controller 124. For example, in some embodiments, management module 121-3 monitors the status of executing commands at NVM 140-1 to 140-n, instead of management module 121-1 performing this function (as discussed in more detail below). In some embodiments, management module 121-3 monitors a portion of NVM devices 140, while management module 121-1 of storage controller 124 monitors the remainder of NVM devices 140. In some embodiments, management module 121-3 monitors a portion of NVM devices 140 (e.g., all NVM devices associated with the NVM controller of which management module 121-3 is a component), and other management modules 121 associated with other NVM modules 160 monitor the remaining NVM devices 140.

Figure 2A:
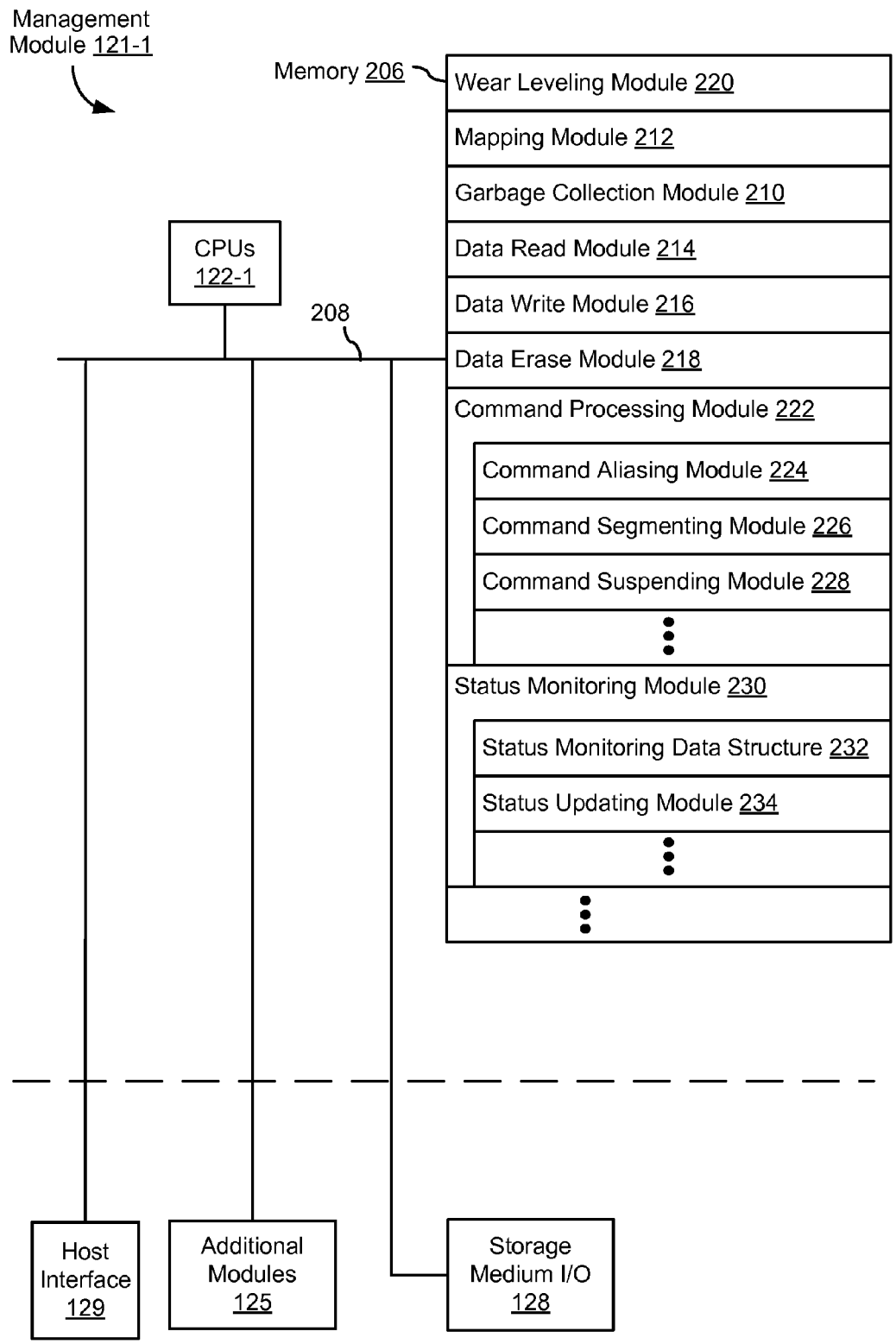
FIGS. 2A and 2B are block diagrams illustrating implementations of management modules in accordance with some embodiments.
Figure 2B:
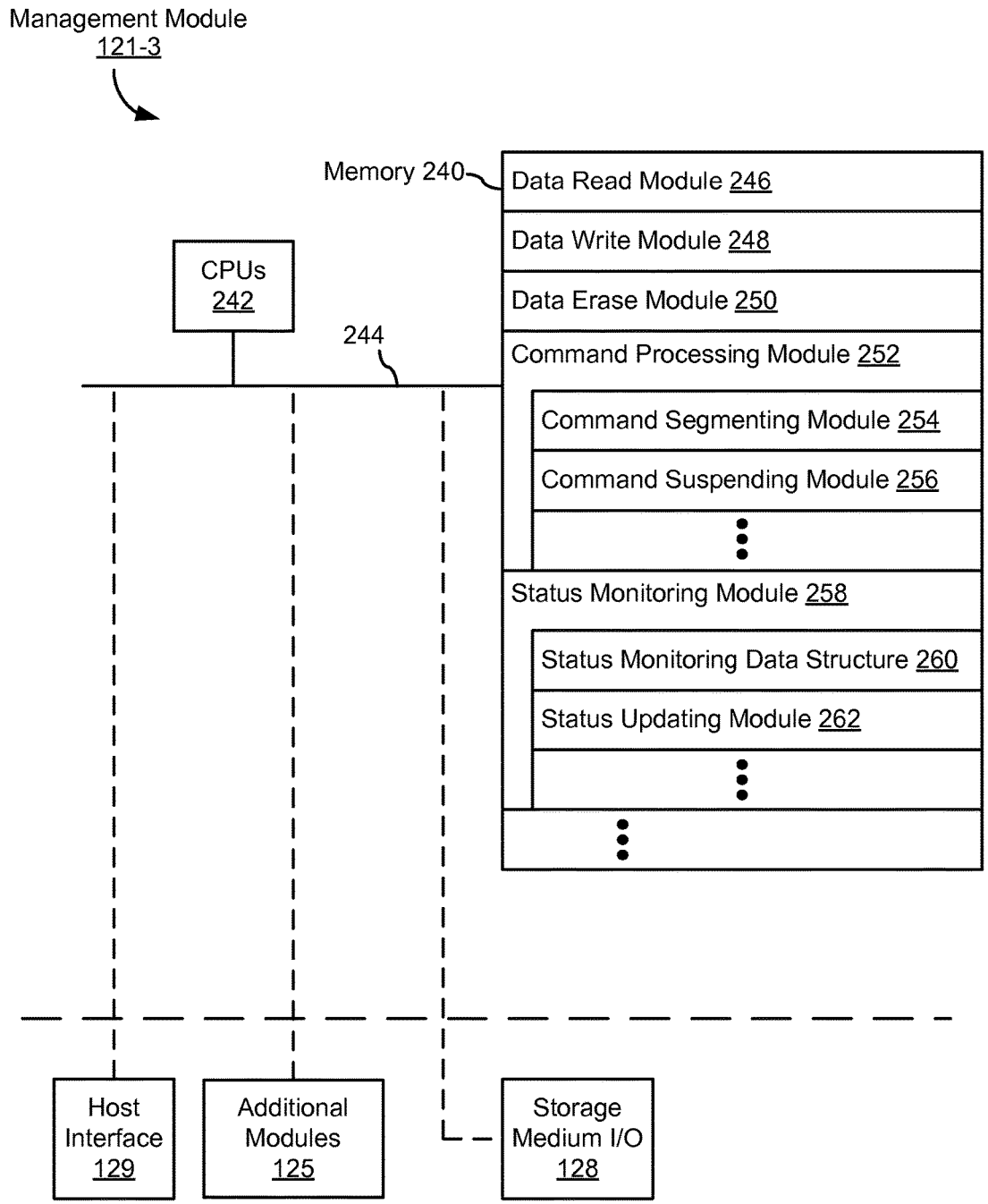

FIG. 2A is a block diagram illustrating a management module 121-1, in accordance with some embodiments, as shown in FIGS. 1A and 1B. Management module 121-1 typically includes one or more processing units (sometimes called CPUs or processors) 122-1 for executing modules, programs, and/or instructions stored in memory 206 (and thereby performing processing operations), memory 206 (sometimes called controller memory), and one or more communication buses 208 for interconnecting these components. The one or more communication buses 208 optionally include circuitry (sometimes called a chipset) that interconnects and controls communications between system components. Management module 121-1 is coupled to host interface 129, additional module(s) 125, and storage medium I/O 128 by the one or more communication buses 208.

Memory 206 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. Memory 206 optionally includes one or more storage devices remotely located from the CPU(s) 122-1. Memory 206, or alternatively the non-volatile memory device(s) within memory 206, comprises a non-transitory computer readable storage medium.

In some embodiments, memory 206, or the non-transitory computer-readable storage medium of memory 206 stores the following programs, modules, and data structures, or a subset or superset thereof:

- wear leveling module 220 for determining pages or blocks of storage device 120 for storing data so as to evenly wear the pages or blocks of storage device 120;
- mapping module 212 that is used for mapping (e.g., using a mapping table) logical addresses in a logical address space to physical addresses, and for maintaining and updating one or more address mapping tables and/or related data structures;
- garbage collection module 210 that is used for garbage collection for one or more blocks in a storage medium (e.g., storage medium 132, FIG. 1A or NVM devices 140, 142, FIG. 1B);
- data read module 214 that is used for reading data from one or more codewords, pages, or blocks in a storage medium (e.g., storage medium 132, FIG. 1A or NVM devices 140, 142, FIG. 1B);
- data write module 216 that is used for writing data to one or more codewords, pages, or blocks in a storage medium (e.g., storage medium 132, FIG. 1A or NVM devices 140, 142, FIG. 1B);
- data erase module 218 that is used for erasing data from one or more blocks in a storage medium (e.g., storage medium 132, FIG. 1A or NVM devices 140, 142, FIG. 1B);
- command processing module 222 that is used for receiving and processing (e.g., suspending, segmenting, and/or executing) a plurality of memory operations corresponding to commands (e.g., I/O commands such as write requests and/or read requests) from a host, optionally including:
  - command aliasing module 224 that is used for retrieving and/or determining aliased addresses for locations at physical NVM die (e.g., NVM die contained within storage medium 132, FIG. 1A or NVM devices 140, 142, FIG. 1B);
  - command segmenting module 226 that is used for dividing a memory operation into a sequence of segmented memory operations; and
  - command suspending module 228 that is used for suspending and resuming performance of memory operations (or suspending and resuming performance of segments of segmented memory operations);
- status monitoring module 230 that is used for monitoring execution statuses for commands that are executing within storage device 120, optionally including:
  - status monitoring data structure 232 for storing information about the status (e.g., complete, suspended, waiting, segment X suspended, or processing) of commands that are executing or waiting for execution within storage device 120; and
  - status updating module 234 for updating information about the status of commands that are executing or waiting for execution within storage device 120.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 206 may store a subset of the modules and data structures identified above. Furthermore, memory 206 may store additional modules and data structures not described above. In some embodiments, the programs, modules, and data structures stored in memory 206, or the non-transitory computer readable storage medium of memory 206, provide instructions for implementing some of the methods described below. In some embodiments, some or all of these modules may be implemented with specialized hardware circuits that subsume part or all of the module functionality.

Although FIG. 2A shows management module 121-1 in accordance with some embodiments, FIG. 2A is intended more as a functional description of the various features which may be present in management module 121-1 than as a structural schematic of the embodiments described herein. In practice, and as recognized by those of ordinary skill in the art, the programs, modules, and data structures shown separately could be combined and some programs, modules, and data structures could be separated.

FIG. 2B is a block diagram illustrating management module 121-3, in accordance with some embodiments, as shown in FIG. 1B. Management module 121-3 typically includes one or more processing units (sometimes called central processing units, CPUs, or processors) 242 for executing modules, programs and/or instructions stored in memory 240 and thereby performing processing operations, memory 240 (sometimes called controller memory or NVM controller memory), and one or more communication buses 244 for interconnecting these components. The one or more communication buses 244 optionally include circuitry (sometimes called a chipset) that interconnects and controls communications between system components. Management module 121-3 is optionally coupled to one or more of host interface 129, additional module(s) 125, and storage medium I/O 128 by the one or more communication buses 244.

Memory 240 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. Memory 240 optionally includes one or more storage devices remotely located from the CPU(s) 242. Memory 240, or alternatively the non-volatile memory device(s) within memory 240, comprises a non-transitory computer-readable storage medium.

In some embodiments, memory 240, or the non-transitory computer-readable storage medium of memory 240 stores the following programs, modules, and data structures, or a subset or superset thereof:

- data read module 246 that is used for reading data from one or more codewords, pages, or blocks in a NVM module (e.g., one or more NVM devices 140 of NVM module 160-1, FIG. 1B);
- data write module 248 that is used for writing data to one or more codewords, pages, or blocks in a NVM module (e.g., one or more NVM devices 140 of NVM module 160-1);
- data erase module 250 that is used for erasing data from one or more blocks in a NVM module (e.g., one or more NVM devices 140 of NVM module 160-1);
- command processing module 252 that is used for receiving and processing (e.g., suspending, segmenting, and/or executing) a plurality of memory operations corresponding to commands (e.g., I/O commands such as write requests and/or read requests) from a host, optionally including:

command segmenting module 254 that is used for dividing a memory operation into a sequence of segmented memory operations; and command suspending module 256 that is used for suspending and resuming performance of memory operations (or suspending and resuming performance of segments of segmented memory operations);

status monitoring module 258 that is used for monitoring execution statuses for commands that are executing at a NVM module (e.g., at one of NVM devices 140, FIG. 1B), optionally including:

status monitoring data structure 260 for storing information about the status (e.g., complete, suspended, waiting, segment X suspended, or processing) of commands that are executing or waiting for execution at a NVM module (e.g., at one of NVM devices 140); and status updating module 262 for updating information about the status of commands that are executing or waiting for execution at a NVM module (e.g., at one of NVM devices 140).

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 240 may store a subset of the modules and data structures identified above. Furthermore, memory 240 may store additional modules and data structures not described above. In some embodiments, the programs, modules, and data structures stored in memory 240, or the non-transitory computer-readable storage medium of memory 240, provide instructions for implementing some of the methods described below. In some embodiments, some or all of these modules may be implemented with specialized hardware circuits that subsume part or all of the module functionality.

Although FIG. 2B shows management module 121-3 in accordance with some embodiments, FIG. 2B is intended more as a functional description of the various features which may be present in management module 121-3 than as a structural schematic of the embodiments described herein. In practice, and as recognized by those of ordinary skill in the art, the programs, modules, and data structures shown separately could be combined and some programs, modules, and data structures could be separated.

FIG. 3A is a block diagram illustrating status monitoring data structures and, more specifically, a status table for managing high-priority operations (e.g., high-priority NAND operations), in accordance with some embodiments. In some embodiments, one or more status monitoring data structures (e.g., status monitoring data structure 232 and/or status monitoring data structure 260) are used to store information about the execution status of memory operations. For example, as illustrated in FIG. 3A, a status monitoring data structure contains records 304-1 through 304-z and optionally contains a header 304-0. Header 304-0, in some embodiments, contains a brief description of each field of information (e.g., each field of the database records) stored within the status monitoring data structure. In this non-limiting example, header 304-0 contains fields for "command type" (e.g., read, write, or erase) "high-priority?" (e.g., yes or no), "NVM die" (e.g., information that identifies a NVM die corresponding to the command), and "status" (e.g., complete, suspended, segment 2 of 9 completed, processing/executing/in-progress, etc.). Optionally, header 304-0 also includes a "plane" field, for example for implementations in which the NVM die in the data storage device or system are multi-plane die.

In some embodiments, each record 304-1-304-z contain one or more additional fields, such as a "received from" field that identifies a component of data storage system 100 (FIG. 1A or 1B) that initiated the corresponding command (e.g., a host, such as computer system 110, or a module within a storage device, such as garbage collection module 210 of management module 121-1).

As pictured in FIG. 3A, records 304-1 through 304-3 contain information corresponding to read commands at NVM die 3. In some embodiments, the status monitoring data structure (e.g., status monitoring data structure 232 or status monitoring data structure 260) contains status information for all recently received memory operation commands, or all memory operation commands who execution has not yet completed, regardless of their command type (e.g., the data structure can include records for read, write, and erase commands). In some other embodiments, the status monitoring data structure contains status information only for low priority memory operation commands (e.g., write and erase commands) that could potentially block execution of higher priority memory operation commands. In some embodiments, a plurality of status monitoring data structures (e.g., status monitoring data structure 232, status monitoring data structure 260, and other status monitoring data structures) are maintained, each respective status monitoring data structure containing status information associated with a specific command type (e.g., write commands only) or with a specific component of data storage system 100 (e.g., NVM device 140-1 or NVM Module 160-1, FIG. 1B). For example, in some embodiments of data storage system 100 shown in FIG. 1B, a separate status monitoring data structure 260 is maintained for each NVM module 160-1 to 160-m.

Continuing with the example pictured in FIG. 3A, Record 304-1 indicates that a low-priority read command was completed at NVM die 3, record 304-2 indicates that another low-priority read command has been suspended at NVM die 3, and record 304-3 indicates that a high-priority read command is currently processing at NVM die 3. Each of these records, in some embodiments, is maintained by a status monitoring module (e.g., status monitoring module 232, FIG. 2A and/or status monitoring module 260, FIG. 2B) and/or a status updating module (e.g., status updating module 234, FIG. 2A and/or status updating module 262, FIG. 2B). For example, once the status monitoring module (or a module in communication with the status monitoring module, e.g. command processing modules 222, 252 and/or data read modules 214, 246) detects that execution of the read command corresponding to record 304-3 has completed, the status updating module will modify record 304-3 to indicate that execution of the command is complete (e.g., by updating the "status" field associated with record 304-3 to have a value of "completed" or, alternatively, by deleting record 304-3).

In some embodiments, one data structure (e.g., one table, database, linked list, text file, etc.) is used to monitor execution statuses for all memory operations at a particular storage medium (e.g., storage medium 132, FIG. 1A or NVM devices 140, 142, FIG. 1B). For example, status monitoring data structure 232 is used, in these embodiments, to monitor execution statuses for all memory operations at storage medium 132.

In other embodiments, one data structure is used for each NVM module (e.g., NVM module 160-1, FIG. 1B). For example, in these embodiments, a status monitoring data structure 260 is maintained for each NVM module 160 (FIG. 1B) of a storage device. Stated another way, in these embodiments, a plurality of status monitoring data structures 260 are maintained, and each status monitoring data structure 260 is used to monitor execution status for memory operations at NVM devices contained within a particular NVM module (e.g., with reference to FIG. 1B, a respective status monitoring data structure 260 maintains execution statuses corresponding to NVM-1 through NVM-n of NVM Module 160-1 and a different status monitoring data structure 260 maintains execution status corresponding to NVM 142-1 through 142-k within NVM Module 160-m).

In still other embodiments, a combination of the above techniques is utilized in accordance with a usage metric associated with portions of a storage medium (e.g., number of commands received per millisecond for a NVM die). For example in these other embodiments, some rarely-accessed portions of storage medium 132 within data storage system 100 utilize only one status monitoring data structure, while other often-accessed portions of storage medium 132 within data storage system 100 utilize multiple status monitoring data structures). In yet other embodiments, a simpler data structure (as compared to the table pictured in FIG. 3A) is maintained that stores only a list of all NVM die within the data storage system 100 (or a subset of NVM die, such as NVM die contained within a particular NVM module) and a flag indicating whether each NVM die is currently performing a low-priority operation.

FIG. 3B is a block diagram illustrating memory operation commands (also referred to as memory operations, memory operation commands, and commands) and, more specifically, address portions of the physical addresses in memory operation commands 320 and 322. As illustrated in FIG. 3B, a memory operation command includes information about the type of command (e.g., read, write, or erase), chip select information (sometimes labeled "CE" because the chip select information or signal is delivered to the chip enable (CE) pins of the chips or circuits that are potential targets of the command), a die-selection portion (e.g., die-selection portions 320-1, 322-1), an intra-die selection portion (e.g., intra-die selection portions 320-2, 322-2), and other information (e.g., data to be written for write commands). In some embodiments, address portions of memory operation commands are utilized to ensure that high-priority commands are executed before low-priority commands, thereby helping to achieve faster command execution times for high-priority commands. Furthermore, in some embodiments that utilize multi-plane NVM die, predefined portions of the physical address in a memory operation command specify not only the die (e.g., die selection portion 320-1) but also the plane to which the memory operation is directed. In some embodiments, the plane is specified by a predefined portion (e.g., one or two most significant bits) of the superblock or block portion of the physical address.

As a specific example, memory operation command 320 represents a write command received from a host (e.g., computer system 110, FIGS. 1A and 1B) and memory operation command 322 represents a read command received from the host and both the write command and the read command in this example are for die 3 (e.g., a NVM die within NVM 140-1 or storage medium 132). In this example, if memory operation command 320 is received (e.g., by command processing module 222 of management module 121-3, FIG. 2A) before memory operation command 322 is received, then memory operation command 320 will, in some embodiments, begin executing at die 3. It is note that since both commands have the same superblock and block address portions, both are directed to the same plane of die 3, if die 3 is a multi-plane die. Because write commands, in some embodiments (e.g., in flash memory devices), take longer to execute than read commands, waiting until a write command completes execution will result in an increased execution time for a subsequently-received read command (because the execution time for the read command will be affected by both the wait time while the write command completes and the actual execution time for the read command). As such, in some embodiments, address aliasing is used to achieve faster execution times for high-priority commands.

Continuing with the specific example, the later-received read command (e.g., memory operation command 322) can be sent to an aliased address (e.g., an aliased address determined by command aliasing module 224) for die 3 (in this example, die 7). Specifically, FIG. 3B illustrates memory operation commands 320 and 322 as differing only in the die-selection portion (e.g., memory operation command 320 has a die-selection portion of 3, while memory operation command 322 has a die-selection portion of 7). The use of die-selection portion to refer to die 7 in memory operation command 322, even though the read command is intended for die 3, is referred to as address aliasing. In some embodiments, the die-selection portion is a three bit field and the most significant bit ("MSB") is used for address aliasing (e.g., by flipping the MSB in the die-selection portion of memory operation command 322, the die-selection portion becomes 7, instead of 3). Although FIG. 3B illustrates a die-selection portion and a separate chip select ("CE") portion in the illustrated memory operation commands, in some embodiments, the die-selection portion includes the chip select ("CE") portion as well.

As discussed above, if a storage device (e.g., storage device 120 or a component thereof) determines that an earlier received command (e.g., a low-priority command) is currently executing at the same die (or die and plane, for multi-plane die) as a subsequently received command, then the storage device would, normally, wait until the earlier received command completes before sending the subsequent command (e.g., a high-priority command) to the particular die. To address this issue, in some embodiments, management module 121-1 relies on command processing module 222 (or a component thereof, such as command aliasing module 224) to send high-priority commands to aliased addresses (e.g., using the MSB of the die-selection portion), so that high-priority commands do not need to wait for low-priority commands to complete execution. Furthermore, in some embodiments, commands sent to a die using an aliased address are noted in the corresponding memory operation status table as belonging to the die with the non-aliased address. Thus, when a high priority read operation is sent to die 3, using die address 7, a status record 304 (FIG. 3A) for the command indicates that the command was sent to die 3 for execution.

Figure 4:
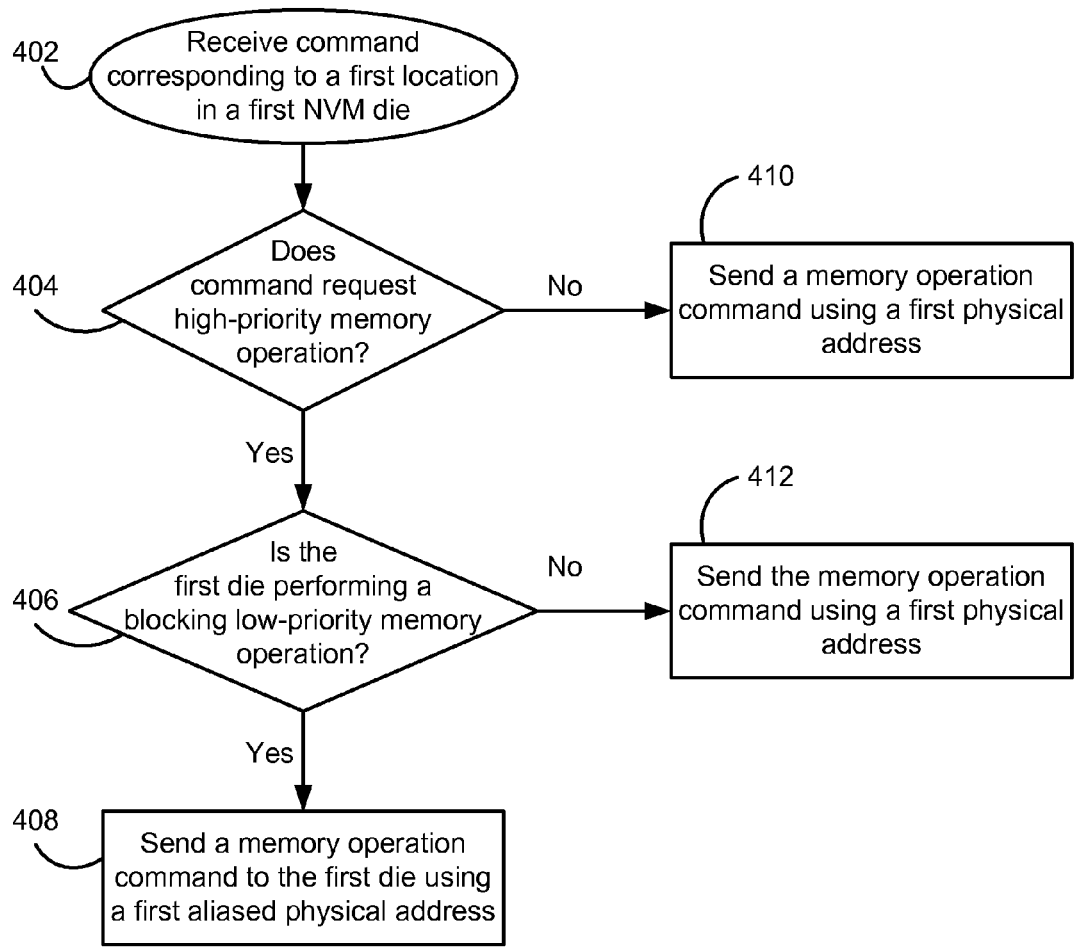
FIG. 4 illustrates a flowchart representation of a method of managing high-priority operations in a storage device in accordance with some embodiments.

FIG. 4 illustrates a flowchart representation of a method of managing high-priority operations within a storage system, in accordance with some embodiments. With reference to the data storage systems 100 pictured in FIGS. 1A and 1B, in some embodiments, high-priority operations management method 400 is performed by a storage device (e.g., storage device 120, FIG. 1A or 1B) or one or more components of the storage device (e.g., storage controller 124 and/or NVM controllers 130). In some embodiments, the storage device is operatively coupled with a host system (e.g., computer system 110). In some embodiments, high-priority operations management method 400 is governed by instructions that are stored in a non-transitory computer-readable storage medium and that are executed by one or more processors of a device, such as the one or more processing units (CPUs) 122-1 of management module 121-1 and/or the one or more processing units (CPUs) 242 (as shown in FIG. 2B) of management module 121-3.

In some embodiments, some of the operations of high-priority operations management method 400 are performed at a host (e.g., computer system 110) and other operations of method 400 are performed at a storage device (e.g., storage device 120). In some embodiments, high-priority operations management method 400 is governed, at least in part, by instructions that are stored in a non-transitory computer-readable storage medium and that are executed by one or more processors of a host (not shown in FIGS. 1A and 1B).

For ease of explanation, the following describes high-priority operations management method 400 as performed by a storage device (e.g., by storage controller 124 of storage device 120, FIGS. 1A and 1B, and/or by NVM controllers 130 of NVM modules 160, FIG. 1B). With reference to FIGS. 2A and 2B, in some embodiments, the operations of method 400 are performed, at least in part, by a command processing module (e.g., command processing module 222 and/or command processing module 252) and a status monitoring module (e.g., status monitoring module 230 and/or status monitoring module 258) of management module 121-1 and/or management module 121-3. However, those skilled in the art will appreciate that in other embodiments, one or more of the operations described in high-priority operations management method 400 are performed by a host (e.g., computer system 110).

High-priority operations management method 400 begins, in some embodiments, when the storage device receives (402) a command corresponding to a first location in a first non-volatile memory die. While the received command might, in some circumstances, correspond to locations in multiple non-volatile memory die, for purposes of this explanation, method 400 is described with respect to managing access to information in just one of those die, herein called a first die for ease of reference. In some circumstances, the command is received from a host (e.g., computer system 110) and requests a read, a write, or an un-map operation at a particular logical block address (LBA) of the storage device. For example, the storage device 120 receives a command from computer system 110 requesting a write operation at LBA 5. In some embodiments, the storage system (or a component thereof, such as mapping module 212, FIG. 2A) performs a look-up in a mapping table (e.g., a logical-to-physical address translation table) and determines a physical address corresponding to LBA 5. In accordance with a first determination (404-No) that the received command does not request a high-priority memory operation (e.g., a read operation), the storage device proceeds to send (410) a memory operation command to the determined physical address using a first physical address. In some circumstances, sending the memory operation command to the determine physical address is delayed (e.g., by putting the memory operation command on a queue, not shown in the Figures) until the memory die corresponding to that physical address has completed execution of one or more previously received memory operation commands that require the same resources (e.g., the same plane, same address decoders, or same read/write circuitry) as the current memory operation command. Such circumstances typically include the memory die having not yet completed execution of the aforementioned one or more previously received memory operation commands that require the same resources as the current memory operation command.

Continuing the example, the storage device determines that LBA 5 corresponds to a physical address located at die 3 (e.g., one of the NVM devices 140 shown in FIG. 1B), super block 1, block 1, page 10 and sends a memory operation command (e.g., memory operation command 320, FIG. 3B) directly to die 3, with address information specifying super block 1, block 1, page 10 of die 3. In this example, the physical address used to send the low-priority memory operation command to die 3 is the same physical address at which the memory operation command will be performed.

In some embodiments, in accordance with the first determination (404-Yes) instead indicating that the received command does request a high-priority memory operation (e.g., the command is a read command from a host device), the storage device proceeds to conduct a second determination (406) before selecting an appropriate physical address to which the read command should be sent. In some embodiments, the second determination is conducted by performing a look-up in a status monitoring data structure (e.g., status monitoring data structure 232 and/or status monitoring data structure 260, FIG. 3A) and checking whether the first die is currently performing a blocking low-priority memory operation (e.g., retrieving records associated with the first die from the status monitoring data structure and then checking for any active, low-priority memory operations requiring the same resources as the received command). For example, if the first die is not performing any memory operation, or is only performing a high-priority memory operation, then the die is not performing a blocking low-priority memory operation. Similarly, if the first die is performing a low-priority memory operation, but in a different plane than the plane specified by the physical address for the received command, then the low-priority memory operation is not a blocking low-priority memory operation.

If the retrieved records from the status monitoring data structure show that the first die is not performing a blocking low-priority command (406-No), then the storage device proceeds to send (412) the memory operation command to the first die using the first physical address.

For example, the storage device 120 receives a command from computer system 110 requesting a read operation at LBA 5. In some embodiments, the storage system (or a component thereof, such as mapping module 212, FIG. 2A) performs a look-up in a mapping table (e.g., a logical-to-physical address translation table) showing that LBA 5 corresponds to a physical address location at die 3, super block 1, block 1, and page 10. The storage device then determines that die 3 is not currently performing a low-priority memory operation and sends a memory operation command (e.g., memory operation command 320, FIG. 3B) directly to super block 1, block 1, and page 10 of die 3 (i.e., die 3 is a first die of NVM device 140-1, FIG. 1B). In this example, the physical address used to send the high-priority memory operation command to the first die is the same physical address at which the memory operation command will be performed.

In some embodiments, in accordance with the first determination (404-Yes) indicating that the received command does request a high-priority memory operation and the second determination indicating that the first die is performing (406-Yes) a blocking low-priority memory operation (e.g., the first die is performing a write operation or an erase operation that requires the same resources as those required by the received command), the storage device sends a memory operation command (e.g., a high-priority read operation command) to the first die using a first aliased physical address. For example, the storage device 120 receives a command from computer system 110 requesting a read operation at LBA 5. In some embodiments, the storage system (or a component thereof, such as mapping module 212, FIG. 2A) performs a look-up in a mapping table (e.g., a logical-to-physical address translation table) and determines that LBA 5 corresponds to a physical address located at die 3, super block 1, block 1, and page 10. The storage device (or a component thereof such as status monitoring module 230 and/or status monitoring module 258) queries a status monitoring data structure (e.g., status monitoring data structure 232 and/or status monitoring data structure 260) to determine whether the first die (e.g., die 3) is performing a blocking low-priority memory operation. In accordance with a determination that the first die is performing a blocking low-priority memory operation, the storage device then sends the memory operation command to the first die using the first aliased physical address (e.g., a component of the storage device, such as command aliasing module 224, flips a MSB of a die-selection portion of memory operation command 322, so that memory operation command 322 is sent to the first aliased physical address for the first die, die 7). In this example, the first aliased address used to send the high-priority memory operation command to the first die is different from the physical address at which the memory operation command will be performed. As discussed above, the use of aliased addresses allows high-priority memory operations to execute more quickly and without having to wait for completion of a low-priority memory operation.

Additional details concerning each of the processing steps for high-priority operations management method 400, as well as details concerning additional processing steps for high-priority operations, are presented below with reference to FIGS. 5A-5C.

Figure 5A:
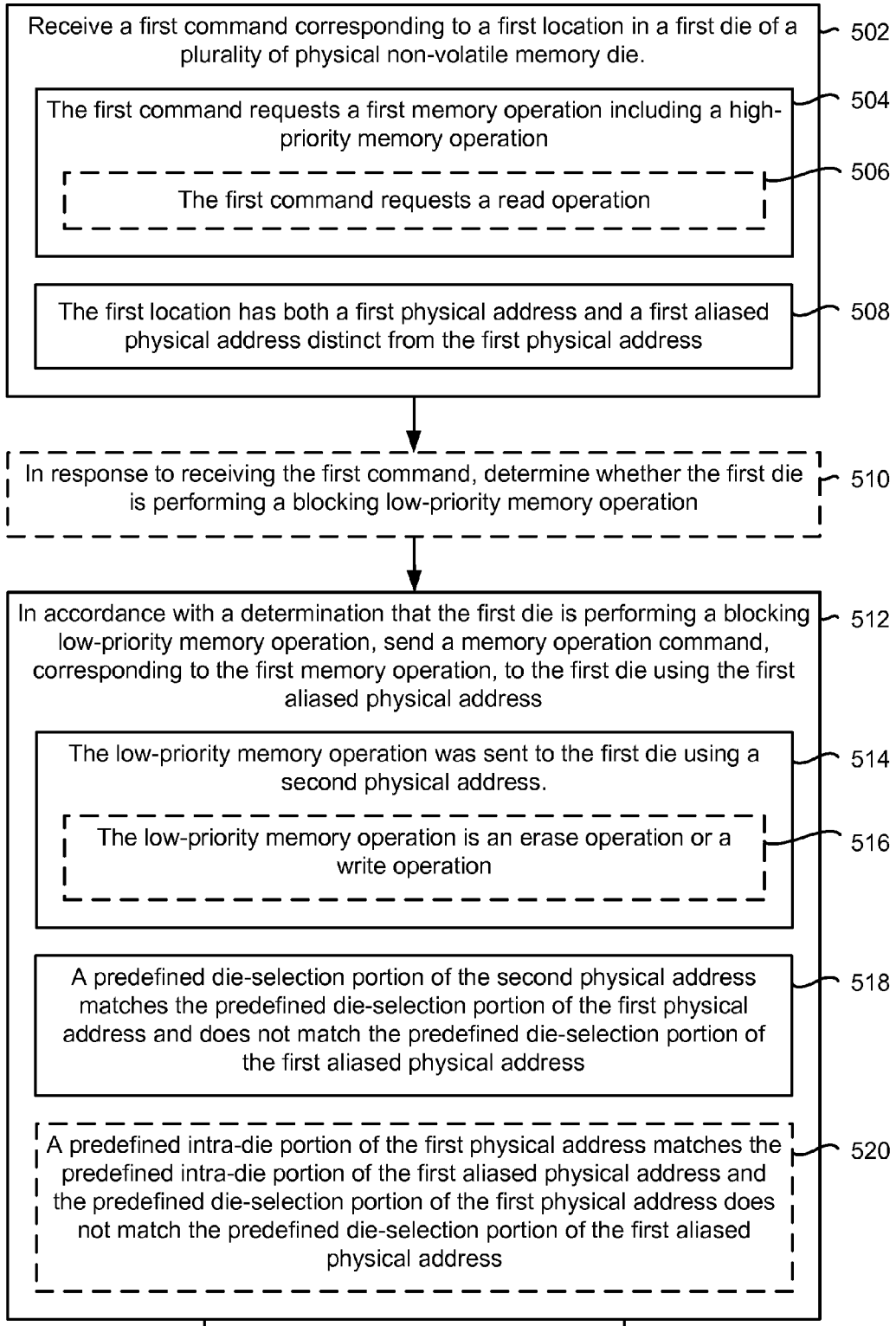
FIGS. 5A-5C illustrate flowchart representations of methods of managing high-priority operations in a storage device, in accordance with some embodiments.
Figure 5B:
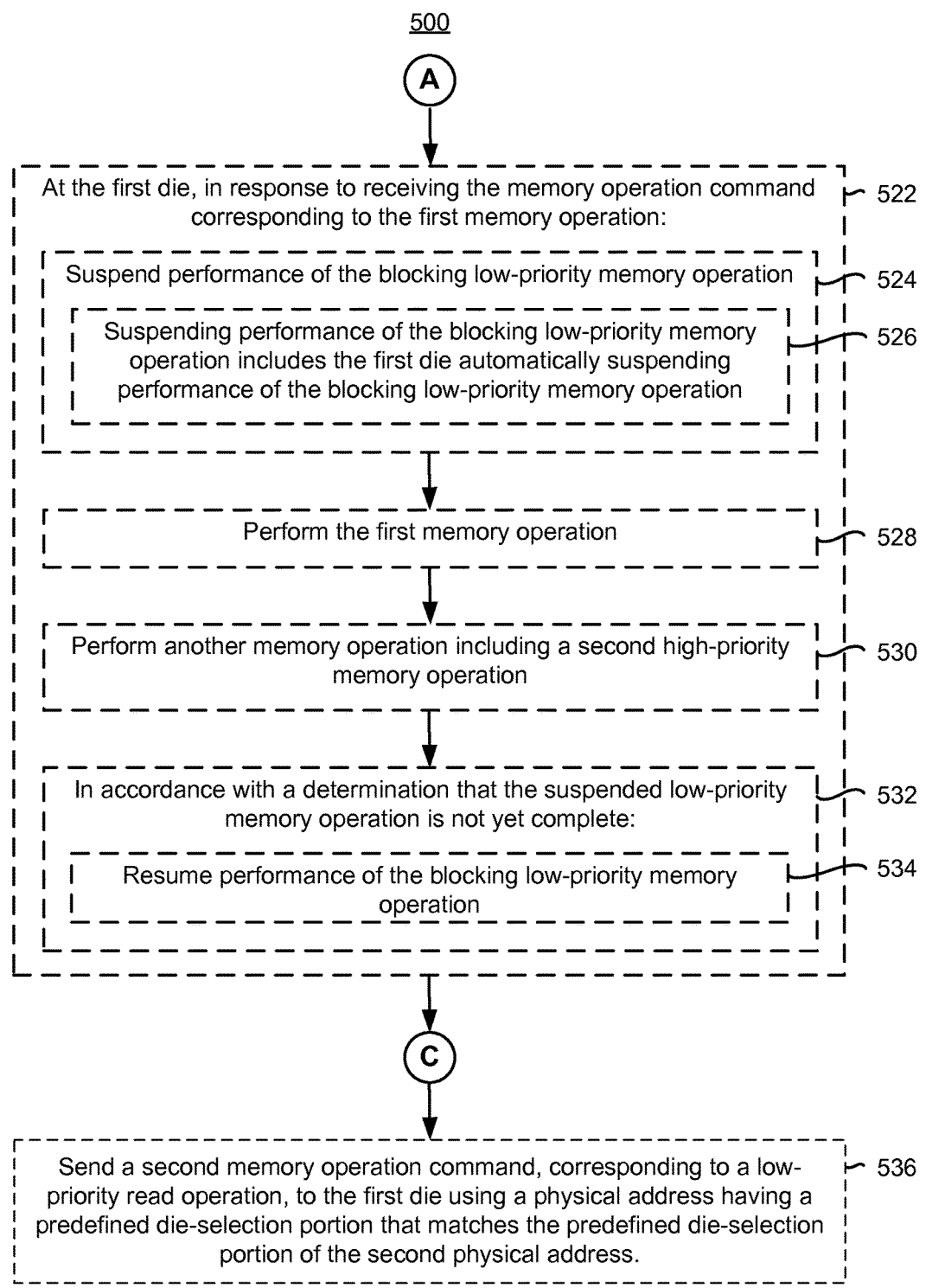
Figure 5C:
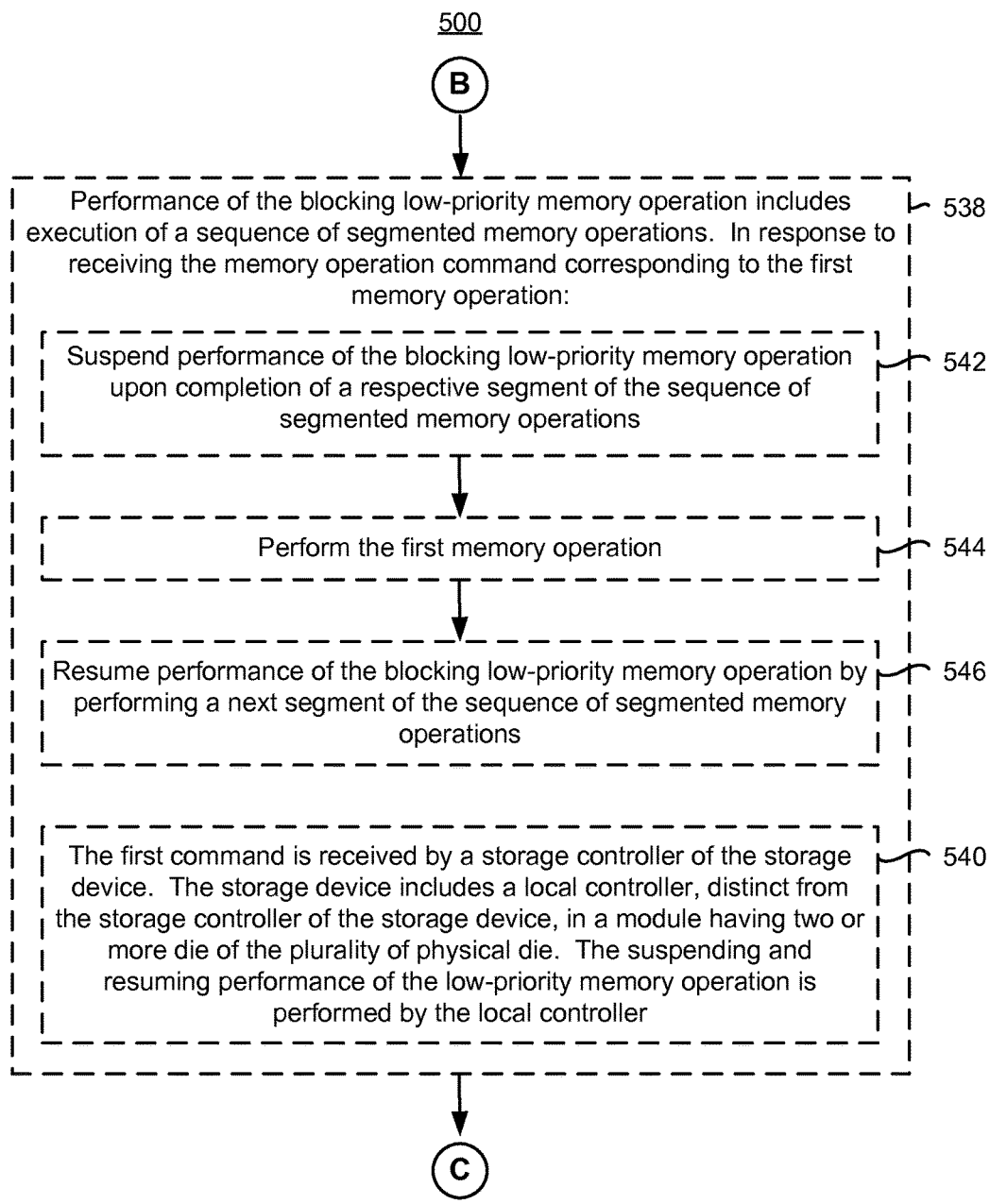

FIGS. 5A-5C illustrate flowchart representations of a method of managing high-priority operations within a storage system, in accordance with some embodiments. With reference to the data storage systems 100 pictured in FIGS. 1A and 1B, in some embodiments, a method 500 is performed by a storage device (e.g., storage device 120) or one or more components of the storage device (e.g., storage controller 124 and/or NVM controllers 130). In some embodiments, the storage device is operatively coupled with a host system (e.g., computer system 110). In some embodiments, the method 500 is governed by instructions that are stored in a non-transitory computer-readable storage medium and that are executed by one or more processors of a device, such as the one or more processing units (CPUs) 122-1 of management module 121-1 and/or the one or more processing units (CPUs) 242 (as shown in FIG. 2B) of management module 121-3.

In some embodiments, some of the operations of method 500 are performed at a host (e.g., computer system 110) and other operations of method 500 are performed at a storage device (e.g., storage device 120). In some embodiments, method 500 is governed, at least in part, by instructions that are stored in a non-transitory computer-readable storage medium and that are executed by one or more processors of a host (not shown in FIGS. 1A and 1B).

For ease of explanation, the following describes method 500 as performed by a storage device (e.g., by storage controller 124 of storage device 120, FIGS. 1A and 1B, and/or by NVM controllers 130 of NVM modules 160, FIG. 1B). With reference to FIGS. 2A and 2B, in some embodiments, the operations of method 500 are performed, at least in part, by a command processing module (e.g., command processing module 222 and/or command processing module 252) and a status monitoring module (e.g., status monitoring module 230 and/or status monitoring module 258) of management module 121-1 and/or management module 121-3. However, those skilled in the art will appreciate that in other embodiments, one or more of the operations described in method 500 are performed by a host (e.g., computer system 110).

A storage device (e.g., storage device 120, FIGS. 1A and 1B) receives (502) a first command corresponding to a first location in a first die of a plurality of physical non-volatile memory die. In some embodiments, the plurality of physical non-volatile memory die are on a single storage medium (e.g., storage medium 132, FIG. 1A), while in other embodiments, the plurality of physical non-volatile memory die are on multiple storage mediums (e.g., NVM devices 140, 142, FIG. 1B). In some circumstances, the first command requests (504) a first memory operation including a high-priority memory operation. In some embodiments, the first command requests (506) a read operation (e.g., the first command requests a read operation having an execution time less than the execution time of low-priority memory operations). In some embodiments, low-priority memory operations have an average execution time that is at least ten times the average execution time of the high-priority memory operation. In some embodiments, the first location (e.g., a first page located on the first die) has both a first physical address and a first aliased physical address distinct from the first physical address (508).

In response to receiving the first command, the storage device determines (510) whether the first die is performing a blocking low-priority memory operation. In some embodiments, the blocking low-priority memory operation is a write operation or an erase operation. In some embodiments, determining whether the first die is performing a blocking low-priority memory operation includes querying a status monitoring data structure (e.g., status monitoring data structure 232 and/or status monitoring data structure 260, FIG. 3A). For example, a status monitoring module (e.g., status monitoring module 230 and/or status monitoring module 258, FIGS. 2A and 2B) retrieves all records associated with the first die and determines whether any of the records indicate that the first die is performing a blocking low-priority memory operation. Alternatively, the status monitoring module retrieves only those records (or a null/empty record set if no records exist) corresponding to active, low-priority memory operations at the first die (e.g., the status monitoring module retrieves any records with a value of "No" for the "High-Priority?" field and a value of "Processing" for the "Status" field).

In accordance with a determination that the first die is performing a blocking low-priority memory operation (e.g., the status monitoring module finds in the status monitoring data structure a record of a currently executing, blocking low-priority memory operation), the storage device sends (512) a memory operation command, corresponding to the first memory operation, to the first die using the first aliased physical address. Alternatively, in other embodiments, the storage device adds the memory operation command, corresponding to the first memory operation, to a queue of high-priority commands (e.g., a queue maintained by management module 121-1 or management module 121-3). In some embodiments, prior to sending the memory operation command, the storage device determines whether the first die is performing a blocking low-priority memory operation (in other words, processing step 510, in some embodiments, occurs prior to processing step 512). In some circumstances, the blocking low-priority memory operation was sent (514) to the first die using a second physical address (e.g., corresponding to a second page located on the first die within the same super block and block as the first page) and the blocking low-priority memory operation is (516) an erase operation or a write operation.

In some embodiments, a predefined die-selection portion of the second physical address matches (518) the predefined die-selection portion of the first physical address and does not match the predefined die-selection portion of the first aliased physical address. For example, the MSB of the predefined die-selection portion of the first physical address has been flipped (e.g., by the command aliasing module 224, FIG. 2A) to produce the predefined die-selection portion of the first aliased physical address. As pictured in FIG. 3B, die-selection 320-1 of memory operation command 320 represents the predefined die-selection portion of both the first and second physical addresses and die-selection portion 322-1 of memory operation command 322 represents the predefined die-selection portion of the first aliased physical address. In some embodiments, a predefined intra-die portion (e.g., intra-die selection 320-2 of memory operation command 320) of the first physical address matches (520) the predefined intra-die portion (e.g., intra-die selection 322-2 of memory operation command 322) of the first aliased physical address and the predefined die-selection portion (e.g., die selection 320-1 of memory operation command 320) of the first physical address does not match the predefined die-selection portion (e.g., die selection 322-1 of memory operation command 322) of the first aliased physical address. As discussed above, in some embodiments, the second physical address corresponds to a second page located on the first die within the same super block and block as the first location (e.g., the first page). In other words, the low-priority operation is being performed on the same die (or, alternatively, the same die and plane) that contains the first location, but the low-priority operation is directed to a second location (e.g., the second page) that is distinct from the first location (e.g., the first page). Therefore, the first and second physical addresses, in this example, differ only in the page portion of the predefined intra-die portion (the predefined die-selection portion is the same).

With reference to FIG. 5B, in some embodiments, at the first die, in response to receiving the memory operation command corresponding to the first memory operation, the storage device (or a component thereof, such as command suspending module 228 or command suspending module 256, FIGS. 2A and 2B) suspends (522) performance of the blocking low-priority memory operation. In some embodiments, suspending performance of the blocking low-priority memory operation includes updating, in the status monitoring data structure, a record corresponding to the blocking low-priority memory operation to indicate that the operation has been suspended (e.g., status updating module 234 or status updating module 262 retrieve the record corresponding to the low-priority memory operation from the appropriate status monitoring data structure and update the "Status" field to have a value of "Suspended," as pictured for Record 304-3 in FIG. 3A). In some embodiments, suspending performance of the blocking low-priority memory operation includes (526) the first die automatically suspending performance of the blocking low-priority memory operation.

In some embodiments, the storage device then performs (528) the first memory operation (e.g., after (or in response to) suspending performance of the blocking low-priority memory operation). In some circumstances (e.g., in which a second high-priority command is received prior to resuming performance of the suspended low-priority memory operation), the storage device performs another memory operation (530) including the second high-priority memory operation. In accordance with a determination (532) that the suspended low-priority memory operation is not yet complete (e.g., by checking the "Status" field of a record corresponding to the low-priority memory operation in the status monitoring data structure), the storage device resumes (534) performance of the blocking low-priority memory operation.

With reference to FIG. 5C, in some embodiments, performance of the blocking low-priority memory operation includes execution of a sequence of segmented memory operations (e.g., an erase operation is segmented by a command segmenting module (e.g., command segmenting module 226 or command segmenting module 254) into five smaller erase operations, such that each segment takes less than two milliseconds to complete). In response to receiving the memory operation command corresponding to the first memory operation (e.g., receiving of the memory operation command was discussed above, with reference to processing steps 502 and 504 of FIG. 5A), the storage device suspends (542) performance of the blocking low-priority memory operation upon completion of a respective segment of the sequence of segmented memory operations.

In some embodiments, the storage device determines that the blocking low-priority memory operation is segmented by querying one or more status monitoring data structures (e.g., status monitoring data structure 232 and/or status monitoring data structure 260). For example, the status monitoring module retrieves a record corresponding to the blocking low-priority memory operation from the status monitoring data structure with a value of "Segmented—Processing Segment 1/5" in the "Status" field. In some embodiments or circumstances, the storage device waits for the completion of the current executing segment (e.g., segment 1/5 of the current example), suspends performance of the low-priority memory operation, and then updates the record corresponding to the low-priority memory operation to have a value of "Suspended—Segment 2/5."

In some embodiments, after suspending performance of the blocking low-priority memory operation (or in response to suspending performance), the storage device performs (544) the first memory operation. In this way, the first memory operation (e.g., a high-priority memory operation, such as a host read command) does not need to wait for the completion of a blocking low-priority memory operation and, thus, the command execution time for high-priority memory operations is decreased. Further, by reducing command execution time for high-priority commands, quality of service metrics for high-priority commands are rarely (if ever) violated. In some embodiments, the storage device resumes (546) performance of the blocking low-priority memory operation by performing a next segment of the sequence of segmented memory operations (e.g., the next segment is the segment immediately following the last respective segment whose performance was completed prior to suspending the blocking low-priority memory operation). In other embodiments, in accordance with a determination (e.g., by checking the status monitoring data structure, as discussed above) that the suspended low-priority memory operation is not yet complete, the storage device resumes performance of the low-priority memory operation.

In some embodiments, the first command is received (540) by a storage controller of the storage device (e.g., storage controller 124, FIGS. 1A and 1B) and the storage device includes a local controller (e.g., NVM controller 130-1, FIG. 2B), distinct from the storage controller of the storage device, in a module (e.g., NVM module 160-1, FIG. 2B) having two or more die of the plurality of physical die (e.g., two or more die of the plurality of physical die on NVM devices 140). In some embodiments, suspending (542) and resuming (546) performance of the blocking low-priority memory operation is performed by the local controller. In this way, by using a local controller to perform one or more operations of the method 500, the storage controller 124 does not need to monitor or manage the performance of segmented operations at individual NVM modules and, thus, the required workload at the storage controller 124 is reduced.

In some embodiments and referring back to FIG. 5B, the storage device sends (536) a second memory operation command, corresponding to a low-priority read operation (e.g., a read operation associated with garbage collection, wear leveling, or some other background process executing on the storage device), to the first die using a physical address having a predefined die-selection portion that matches the predefined die-selection portion of the second physical address. In some embodiments, the second memory operation is sent after either (or both of) processing steps 534 and/or 540 of the method 500. The second memory operation command, corresponding to a low-priority read operation, is then executed in the normal course, without using the above described mechanisms for prioritized execution of high-priority memory operations. For example, referring to FIG. 4, the second memory operation command would be identified at 404 as not requesting a high-priority memory operation (404-No), and thus would be sent to a memory die specified by the physical address for the second memory operation command, using a non-aliased physical address.

It will be understood that, although the terms "first," "second," etc. may be used herein to describe various elements, these elements should not be limited by these terms. These terms are only used to distinguish one element from another. For example, a first transistor could be termed a second transistor, and, similarly, a second transistor could be termed a first transistor, without changing the meaning of the description, so long as all occurrences of the "first transistor" are renamed consistently and all occurrences of the "second transistor" are renamed consistently. The first transistor and the second transistor are both transistors, but they are not the same transistor.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A method of managing a storage device that includes a plurality of physical non-volatile memory die, the method comprising:
   receiving at the storage device a first command corresponding to a first location in a first die of the plurality of physical non-volatile memory die in the storage device, wherein the first command requests a first memory operation comprising a high-priority operation, the first location having both a first physical address and a first aliased physical address distinct from the first physical address;
   in accordance with a determination that the first die is performing a blocking low-priority memory operation:
      sending a memory operation command, corresponding to the first memory operation, to the first die using the first aliased physical address;
   wherein
      the blocking low-priority memory operation was sent to the first die using a second physical address; and
      a predefined die-selection portion of the second physical address matches the predefined die-selection portion of the first physical address and does not match the predefined die-selection portion of the first aliased physical address.

2. The method of claim 1, further comprising, in response to receiving the first command, determining whether the first die is performing a blocking low-priority memory operation.

3. The method of claim 1, wherein a predefined intra-die portion of the first physical address matches the predefined intra-die portion of the first aliased physical address, and the predefined die-selection portion of the first physical address does not match the predefined die-selection portion of the first aliased physical address.

4. The method of claim 1, including, at the first die, in response to receiving the memory operation command corresponding to the first memory operation, suspending performance of the blocking low-priority memory operation; after the suspending, performing the first memory operation, and after performing the first memory operation, resuming performance of the blocking low-priority memory operation.

5. The method of claim 4, wherein suspending performance of the blocking low-priority memory operation includes the first die automatically suspending performance of the blocking low-priority memory operation after receiving the memory operation command corresponding to the first memory operation.

6. The method of claim 4, including, after the suspending and prior to the resuming, performing the first memory operation and another memory operation comprising a second high-priority memory operation.

7. The method of claim 1, including, at the first die, in response to receiving the memory operation command corresponding to the first memory operation, suspending performance of the blocking low-priority memory operation; after the suspending, performing the first memory operation, and after performing the first memory operation, in accordance with a determination that the suspended low-priority memory operation is not yet complete, resuming performance of the suspended low-priority memory operation.

8. The method of claim 1, wherein performance of the blocking low-priority memory operation comprises execution of a sequence of segmented memory operations, and the method includes:
in response to receiving the memory operation command corresponding to the first memory operation, suspending performance of the blocking low-priority memory operation upon completion of a respective segment of the sequence of segmented memory operations, after the suspending, performing the first memory operation, and after performing the first memory operation, resuming performance of the blocking low-priority memory operation by performing a next segment of the sequence of segmented memory operations.

9. The method of claim 8, wherein the first command is received at a storage controller of the storage device, and the suspending and resuming performance of the blocking low-priority memory operation is performed by a local controller, distinct from the storage controller of the storage device, in a module having two or more die of the plurality of physical die.

10. The method of claim 1, wherein the first command requests a read operation.

11. The method of claim 10, further comprising sending a second memory operation command, corresponding to a low-priority read operation, to the first die using a physical address having a predefined die-selection portion that matches the predefined die-selection portion of the second physical address.

12. The method of claim 1, wherein the blocking low-priority memory operation is an erase operation or a write operation.

13. A storage device, comprising:
non-volatile memory, including a plurality of physical non-volatile memory die; and
a storage controller having one or more controller modules configured to:
receive at the storage device a first command corresponding to a first location in a first die of the plurality of physical non-volatile memory die in the storage device, wherein the first command requests a first memory operation comprising a high-priority operation, the first location having both a first physical address and a first aliased physical address distinct from the first physical address;
send, in accordance with a determination that the first die is performing a blocking low-priority memory operation, a memory operation command, corresponding to the first memory operation, to the first die using the first aliased physical address;

wherein:
the blocking low-priority memory operation was sent to the first die using a second physical address; and
a predefined die-selection portion of the second physical address matches the predefined die-selection portion of the first physical address and does not match the predefined die-selection portion of the first aliased physical address.

14. The storage device of claim 13, comprising:
wherein the one or more controller modules include:
a status monitoring module to determine whether the first die is performing a blocking low-priority memory operation; and
a command processing module to receive at the storage device the first command and to send, in accordance with the determination that the first die is performing a blocking low-priority memory operation, the memory operation command corresponding to the first memory operation to the first die using the first aliased physical address.

15. The storage device of claim 14, further comprising:
a plurality of storage modules, each storage module comprising:
a local controller including an instance of the command processing module and an instance of the status monitoring module; and
a plurality of non-volatile memory devices;
wherein:
the first command is for reading data from a first storage module of the plurality of storage modules, and wherein the first storage module includes the first die; and
the instance of the status monitoring module in the first storage module is configured to determine whether the first die is performing a blocking low-priority memory operation.

16. The storage device of claim 13, further comprising:
a plurality of storage modules, each storage module having a local controller and a plurality of non-volatile memory devices.

17. The storage device of claim 13, wherein the storage device is configured to determine, in response to receiving the first command, whether the first die is performing a blocking low-priority memory operation.

18. The storage device of claim 13, wherein a predefined intra-die portion of the first physical address matches the predefined intra-die portion of the first aliased physical address, and the predefined die-selection portion of the first physical address does not match the predefined die-selection portion of the first aliased physical address.

19. A non-transitory computer-readable storage medium, storing one or more programs configured for execution by one or more processors of a storage device, the one or more programs including instructions that when executed by the one or more processors cause the storage device to:
receive at the storage device a first command corresponding to a first location in a first die of a plurality of physical non-volatile memory die in the storage device, wherein the first command requests a first memory operation comprising a high-priority operation, the first location having both a first physical address and a first aliased physical address distinct from the first physical address;
send, in accordance with a determination that the first die is performing a blocking low-priority memory operation, a memory operation command, corresponding to the first memory operation, to the first die using the first aliased physical address;

wherein:
the blocking low-priority memory operation was sent to the first die using a second physical address; and
a predefined die-selection portion of the second physical address matches the predefined die-selection portion of the first physical address and does not match the predefined die-selection portion of the first aliased physical address.

20. The non-transitory computer-readable storage medium of claim 19, the storage device includes a storage controller that includes the one or more processors, the one or more programs include one or more controller modules configured for execution by the one or more processors of the storage controller, and the one or more controller modules include:
a status monitoring module to determine whether the first die is performing a blocking low-priority memory operation; and
a command processing module to receive at the storage device the first command and to send, in accordance with the determination that the first die is performing a blocking low-priority memory operation, the memory operation command corresponding to the first memory operation to the first die using the first aliased physical address.

21. The storage device of claim 13, wherein the storage device is further configured to perform operations comprising:
at the first die,
in response to receiving the memory operation command corresponding to the first memory operation, suspending performance of the blocking low-priority memory operation; and
after the suspending, performing the first memory operation, and after performing the first memory operation, resuming performance of the blocking low-priority memory operation.

22. The storage device of claim 13, wherein the storage device is further configured to perform operations comprising:
at the first die,
in response to receiving the memory operation command corresponding to the first memory operation, suspending performance of the blocking low-priority memory operation;
after the suspending, performing the first memory operation; and
after performing the first memory operation, in accordance with a determination that the suspended low-priority memory operation is not yet complete, resuming performance of the suspended low-priority memory operation.

23. A storage device, comprising:
non-volatile memory, including a plurality of physical non-volatile memory die; and
controller means
for receiving at the storage device a first command corresponding to a first location in a first die of the plurality of physical non-volatile memory die in the storage device, wherein the first command requests a first memory operation comprising a high-priority operation, the first location having both a first physical address and a first aliased physical address distinct from the first physical address; and
for sending, in accordance with a determination that the first die is performing a blocking low-priority memory operation, a memory operation command, corresponding to the first memory operation, to the first die using the first aliased physical address;

wherein:
the blocking low-priority memory operation was sent to the first die using a second physical address; and
a predefined die-selection portion of the second physical address matches the predefined die-selection portion of the first physical address and does not match the predefined die-selection portion of the first aliased physical address.

* * * * *